US012730617B2

(12) United States Patent
Gupta et al.

(10) Patent No.: US 12,730,617 B2
(45) Date of Patent: Sep. 8, 2026

(54) DATAFLOW GRAPH PROGRAMMING ENVIRONMENT FOR A HETEROGENOUS PROCESSING SYSTEM

(71) Applicant: XILINX, INC., San Jose, CA (US)

(72) Inventors: Shail Aditya Gupta, San Jose, CA (US); Samuel R. Bayliss, Mountain View, CA (US); Vinod Kathail, Palo Alto, CA (US); Ralph D. Wittig, Menlo Park, CA (US); Philip B. James-Roxby, Longmont, CO (US); Akella Sastry, San Jose, CA (US)

(73) Assignee: XILINX, INC., San Jose, CA (US)

( * ) Notice: Subject to any disclaimer, the term of this patent is extended or adjusted under 35 U.S.C. 154(b) by 359 days.

(21) Appl. No.: 17/517,471

(22) Filed: Nov. 2, 2021

(65) Prior Publication Data

US 2022/0058005 A1 Feb. 24, 2022

Related U.S. Application Data

(63) Continuation of application No. 16/420,831, filed on May 23, 2019, now Pat. No. 11,204,745.

(51) Int. Cl.
*G06F 9/44* (2018.01)
*G06F 8/41* (2018.01)
(Continued)

(52) U.S. Cl.
CPC ................ *G06F 8/433* (2013.01); *G06F 8/47* (2013.01); *G06F 9/544* (2013.01); *G06F 15/7807* (2013.01); *G06F 16/9024* (2019.01)

(58) Field of Classification Search
CPC ........ G06F 8/433; G06F 8/47; G06F 16/9024; G06F 9/544; G06F 15/7807
See application file for complete search history.

(56) References Cited

U.S. PATENT DOCUMENTS 5,848,264 A 12/1998 Baird et al.
6,090,156 A 7/2000 MacLeod
(Continued)

FOREIGN PATENT DOCUMENTS

JP 2012248114 A 12/2012
JP 2018507449 A 3/2018
WO 2011096016 A1 8/2011

OTHER PUBLICATIONS

Office Action from European Application No. 20721343.0 dated Jul. 28, 2023.
Office Action for Japanese Patent Application No. 2021-569564 dated Oct. 31, 2023.
Dubach, Christophe, et al., Compiling a High-level Language for GPUS, PLDI'12: Proceedings of the 33rd ACM SIGPLAN COnference on Programming Lanaguage Design and Implementation, US, ACM [online], Jun. 11, 2012, vol. 47, Issue 6, p. 1-11.
(Continued)

*Primary Examiner* — Bradley A Teets
*Assistant Examiner* — Lenin Paulino
(74) *Attorney, Agent, or Firm* — Patterson + Sheridan, LLP

(57) ABSTRACT

Examples herein describe techniques for generating dataflow graphs using source code for defining kernels and communication links between those kernels. In one embodiment, the graph is formed using nodes (e.g., kernels) which are communicatively coupled by edges (e.g., the communication links between the kernels). A compiler converts the source code into a bit stream and/or binary code which configure a heterogeneous processing system of a SoC to execute the graph. The compiler uses the graph expressed in source code to determine where to assign the kernels in the heterogeneous processing system. Further, the compiler can select the specific communication techniques to establish the communication links between the kernels and whether synchronization should be used in a communication link. Thus, the programmer can express the dataflow graph at a high-
(Continued)

level (using source code) without understanding about how the operator graph is implemented using the heterogeneous hardware in the SoC.

19 Claims, 22 Drawing Sheets

(51) Int. Cl.

| | |
|---|---|
| ***G06F 9/54*** | (2006.01) |
| ***G06F 15/78*** | (2006.01) |
| ***G06F 16/901*** | (2019.01) |

(56) References Cited

U.S. PATENT DOCUMENTS

| | | | | |
|---|---|---|---|---|
| 7,080,283 | B1 | 7/2006 | Songer et al. | |
| 8,719,808 | B1 | 5/2014 | Prinzing | |
| 9,578,099 | B2 | 2/2017 | Llorca et al. | |
| 2008/0114937 | A1 | 5/2008 | Reid et al. | |
| 2010/0322237 | A1 | 12/2010 | Raja et al. | |
| 2011/0265182 | A1* | 10/2011 | Peinado | G06F 21/566 711/E12.001 |
| 2012/0166417 | A1* | 6/2012 | Chandramouli | G06F 16/24568 707/E17.017 |
| 2017/0161419 | A1 | 6/2017 | Ganusov et al. | |
| 2017/0195258 | A1 | 7/2017 | Wang et al. | |
| 2017/0207998 | A1 | 7/2017 | Fraisse | |
| 2017/0220499 | A1 | 8/2017 | Gray | |
| 2017/0262567 | A1* | 9/2017 | Vassiliev | H03K 19/17736 |
| 2017/0371913 | A1* | 12/2017 | Peterson | G06F 16/2343 |
| 2018/0300633 | A1* | 10/2018 | Mcbride | G06F 1/3206 |
| 2019/0057305 | A1 | 2/2019 | Denolf et al. | |
| 2019/0114193 | A1* | 4/2019 | Cha | G06F 9/45558 |
| 2019/0122415 | A1* | 4/2019 | S. | G06T 15/005 |
| 2019/0235917 | A1* | 8/2019 | Koneru | G06F 9/4843 |
| 2019/0303153 | A1* | 10/2019 | Halpern | G06F 15/825 |
| 2020/0167139 | A1* | 5/2020 | Drepper | G06F 8/451 |
| 2020/0202246 | A1* | 6/2020 | Lin | G06F 16/24568 |

OTHER PUBLICATIONS

"Xilinx Unveils Revolutionary Adaptable Computing Product Category", Xilinx, Inc., Mar. 19, 2018.
"Versal: The First Adaptive Computer Acceleration Platform (ACAP)", Xilinx, Inc., WP505 (v1.0), Oct. 2, 2018.
Bokhari, S.H., "On the mapping problem," IEEE Transactions on Computers, Mar. 1981, vol. 1, No. 3, pp. 207-214.
Xilinx, "Xilinx AI Engines and Their Applications," WP506 (v1.0. 2), Oct. 3, 2018, 13 pg., Xilinx, Inc., San Jose, California, USA.
Xilinx, "SDAccel Development Environment User Guide," UG1023 (v.2015.1), Sep. 15, 2015, 95 pg., Xilinx, Inc., San Jose, California, USA.
Xilinx, "Versal Architecture and Product Data Sheet: Overview," DS950 (v1.0), Oct. 2, 2018, 23 pg., Xilinx, Inc., San Jose, California, USA.
Christophe Dubach et al., "Compiling a high-level lnaguage for GPU's", Proceedings of teh 2009 ACM Sigplan confernece and Implementaion: Jun. 15-20, 2009 Dublin, Ireland: [Sigplan Notices: a Monthly Publication of teh Special Interest Group on Programming Languages of the, vol. 47 No. 6, Jun. 11, 2012.
Office Action from Korean Patent Application No. 10-2021-7042138 dated Nov. 1, 2024, with English translation.
Examination Report for Indian Patent Application No. 202147058122 dated Sep. 12, 2025.

* cited by examiner

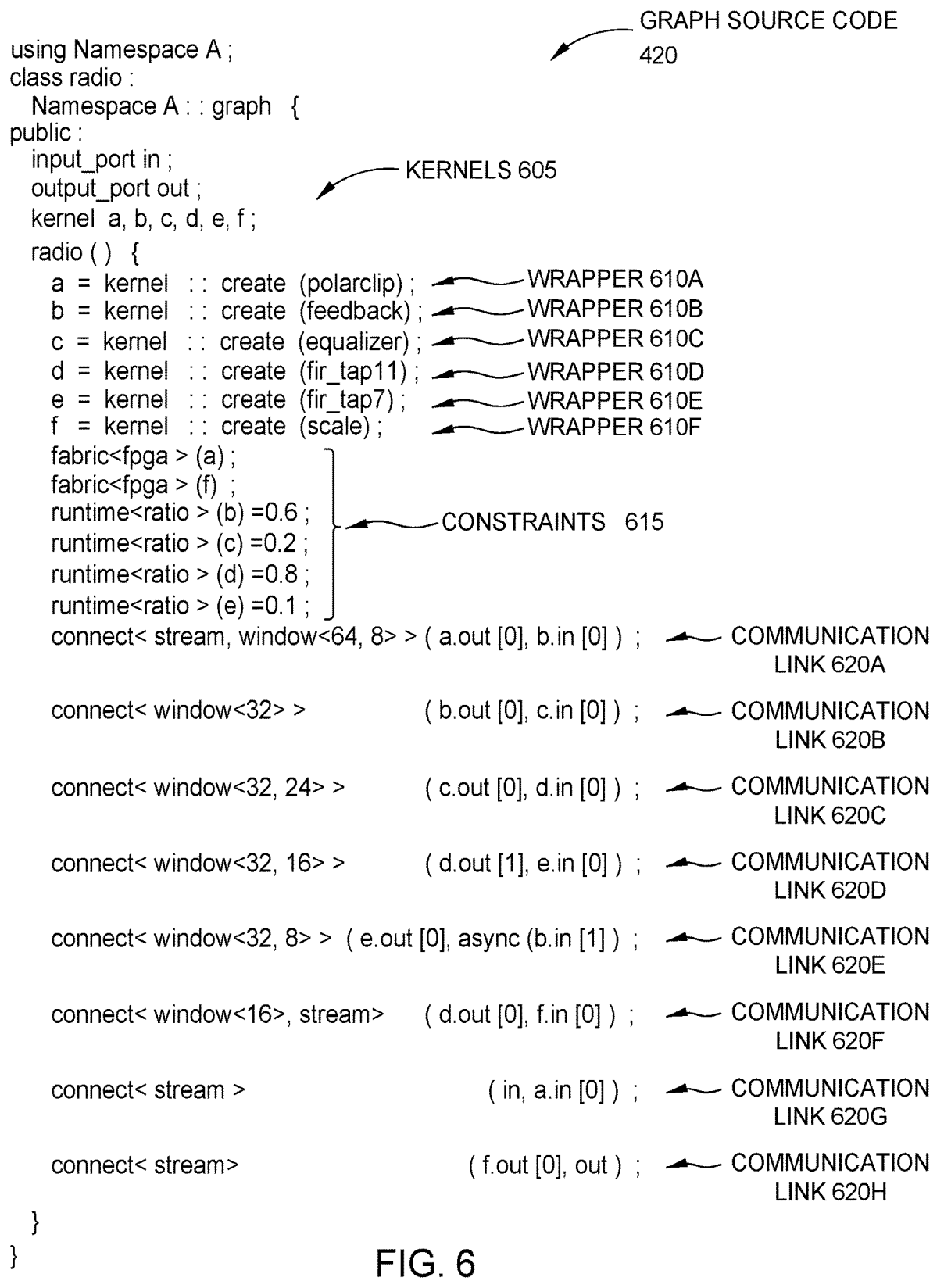

GRAPH SOURCE CODE 420

```
using Namespace A ;
class radio :
  Namespace A : : graph  {
public :
  input_port in ;
  output_port out ;
  kernel  a, b, c, d, e, f ;
  radio ( )  {
    a  =  kernel  : :  create  (polarclip) ;
    b  =  kernel  : :  create  (feedback) ;
    c  =  kernel  : :  create  (equalizer) ;
    d  =  kernel  : :  create  (fir_tap11) ;
    e  =  kernel  : :  create  (fir_tap7) ;
    f  =  kernel  : :  create  (scale) ;
    fabric<fpga > (a) ;
    fabric<fpga > (f)  ;
    runtime<ratio > (b) =0.6 ;
    runtime<ratio > (c) =0.2 ;
    runtime<ratio > (d) =0.8 ;
    runtime<ratio > (e) =0.1 ;
    connect< stream, window<64, 8> > ( a.out [0], b.in [0] )  ;
    connect< window<32> >               ( b.out [0], c.in [0] )  ;
    connect< window<32, 24> >           ( c.out [0], d.in [0] )  ;
    connect< window<32, 16> >           ( d.out [1], e.in [0] )  ;
    connect< window<32, 8> >  ( e.out [0], async (b.in [1] )  ;
    connect< window<16>, stream>      ( d.out [0], f.in [0] )  ;
    connect< stream >                         ( in, a.in [0] )  ;
    connect< stream>                        ( f.out [0], out )  ;
  }
}
```

KERNELS 605

WRAPPER 610A
WRAPPER 610B
WRAPPER 610C
WRAPPER 610D
WRAPPER 610E
WRAPPER 610F

CONSTRAINTS 615

COMMUNICATION LINK 620A
COMMUNICATION LINK 620B
COMMUNICATION LINK 620C
COMMUNICATION LINK 620D
COMMUNICATION LINK 620E
COMMUNICATION LINK 620F
COMMUNICATION LINK 620G
COMMUNICATION LINK 620H

FIG. 6

KERNEL SOURCE CODE
425

ARGUMENTS
805

```
void kernel1 (input_window_cint16 *inputw,  output_window_cint16 *outputw)   {
v8cint16   vdata ;
window readincr (inputw, vdata)  ;
sbuff = upd_w0   (sbuff, vdata)  ;
/ /  Do math with sbuff
window writeincr (outputw, vdata)  ;
}
```

CONTROL SOURCE CODE 430

```
radio mygraph ;
simulation : :  platform <1, 1 > platform ( "in. txt", "out. txt" )   ;
connect< >  net0 ( platform.src [0], mygraph.in)  ;
connect< >  net1 ( platform.sink [0], mygraph.out)  ;
int main (void)   {
   mygraph . init  ( )   ;
   mygraph . run ( )   ;
   mygraph . end ( )   ;
   return  0   ;
}
```

CONNECTIONS 1205

APIs 1905

```
class graph {
   graph ( ) ; // Graph base constructor

   void init( ); //Initialize a graph compiled to DPE + PL
   void run( ); //Run a graph with default number of iterations
   void run(int test_iter); //Run a graph with specified number of iterations.
   void wait( ); //Wait for the last run(...) to complete. Allow control, monitoring, and interaction with the graph in a deterministic state.
   void wait(unsigned int cycle_timeout); //Wait for a specific cycles since last run(...) and pause the graph (for control, monitoring, or interaction)
   void resume( ); //Resume graph execution after pause
   void end( ); //Wait for the last run(...) to complete and disable the DPE cores
   void end(unsigned int cycle_timeout); //Wait for a specific cycles since last run(...) and disable the DPE cores

   void update(input_port& p, int32 value); //Update runtime parameter to adjust application behavior
   void update(input_port& p, const int32* value, size_t size); //Update runtime array parameter. APIs for other data types are available but not listed.

   void read(inout_port& p, int32& value); //Read runtime parameter from application to monitor or to make informed decision
   void read(inout_port& p, int32* value, size_t size); //Read runtime array parameter.  APIs for other data types are available but not listed.
};

class RCGraph : public graph {
  RCGraph ( ) ;
  void as_alternative ( );
};

class RegisterAlternatives {
   RegisterAlternatives (RCGraph & container, std::vector <RCGraph* > alternatives);
};
```

```
class GMIO {
    GMIO(std::string logical_name, unsigned int burst_length, unsigned int bandwidth, enum gmio_address_type);
                // Allocate a GMIO with desired burst length, BW, and hardware address configuration
    void init(const void* start_address, size_t total_size); //Initialize a PS memory space to be tranferred into DPE or PL
    void gm2me_nb(const void* address, size_t transaction_size); //Initiate PS to DPE memory transfer
    void me2gm_nb(void* address, size_t transaction_size); //Initiate DPE to PS memory transfer
    void wait(); //Wait for the latest transaction to complete
};

class PLIO {
    PLIO(std::string logical_name, PLIOType plio_type, std::string filename); // Allocate a PLIO with a desired width
};

class Event {
    static handle start_tracing(kernel& node); //Start event trace for a kernel
    static handle stop_tracing(kernel& node); //Stop event trace for a kernel
    static handle start_profiling(IoAttr& io, enum profiling_option); //Start performance counter for the profiling option
    static long long read_profiling(handle); //Read performance counter for the profiling option
    static void stop_profiling(handle); //Stop performance counter and release resources
};
```

FIG. 20B

DATAFLOW GRAPH PROGRAMMING ENVIRONMENT FOR A HETEROGENOUS PROCESSING SYSTEM

CROSS-REFERENCE TO RELATED APPLICATION

This application is a continuation of U.S. Non-Provisional application Ser. No. 16/420,831 filed May 23, 2019, the contents of which are hereby incorporated by reference in its entirety.

TECHNICAL FIELD

Examples of the present disclosure generally relate to using object orientated programming code to generate a dataflow graph in a system that includes a mix of programmable and software-configurable hardened hardware elements.

BACKGROUND

A system on a chip (SoC) can include a mix of programmable logic (e.g., programmable fabric) and software-configurable hardened logic such as processing cores or engines. Typically, a user must understand in detail the programmable and software configurable hardened logic (and how they communicate) in order to write programs which can be compiled into a bitstream for configuring the programmable and binary code for configuring the software-configurable hardened logic to perform a user function. But using hardware description language (HDL) or Open Computing Language (OpenCL) to write programs for a SoC with a mix of programmable and hardened logic is cumbersome and difficult to parallelize. Data-parallelism and thread-parallelism are also used to express computations over an array of processors but these techniques do not extend naturally to programmable logic where heterogeneous computations with different interfaces need to be expressed.

SUMMARY

Techniques for implementing a dataflow graph on a heterogeneous processing system are described. One example is a method that includes receiving graph source code, the graph source code defining a plurality of kernels and a plurality of communication links, where each of the plurality of communication links couple a respective pair of the plurality of kernels to form a dataflow graph. The method also includes compiling the graph source code to implement the dataflow graph on a system in a heterogeneous processing system. Compiling the graph source code includes assigning the plurality of kernels to programmable logic and an array of data processing engines (DPEs) in the heterogeneous processing system, assigning a communication type to the plurality of communication links, and selecting synchronization techniques for transferring data between the plurality of kernels using the plurality of communication links.

One example described herein is a host that includes a processor, graph source code defining a plurality of kernels and a plurality of communication links where each of the plurality of communication links couple a respective pair of the plurality of kernels to form a dataflow graph, and a compiler configured to compile the graph source code to implement the dataflow graph in a heterogeneous processing system. Compiling the graph source code includes assigning the plurality of kernels to programmable logic and an array of DPEs in the heterogeneous processing system, assigning a communication type to the plurality of communication links, and selecting synchronization techniques for transferring data between the plurality of kernels using the plurality of communication links.

One example described herein is non-transitory computer readable storage medium comprising computer readable program code embodied thereon, the program code performs an operation when executed on a computer processor, the operation includes receiving graph source code, the graph source code defining a plurality of kernels and a plurality of communication links where each of the plurality of communication links couple a respective pair of the plurality of kernels to form a dataflow graph. The operation also includes compiling the graph source code to implement the dataflow graph in a heterogeneous processing system. Compiling the graph source code includes assigning the plurality of kernels to programmable logic and an array of DPEs in the heterogeneous processing system, assigning a communication type to the plurality of communication links, and selecting synchronization techniques for transferring data between the plurality of kernels using the plurality of communication links.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 6 is graph source code for defining a dataflow graph, according to an example.

FIGS. 20A and 20B illustrate control application program interfaces for controlling the execution of a dataflow graph on the SoC, according to examples.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
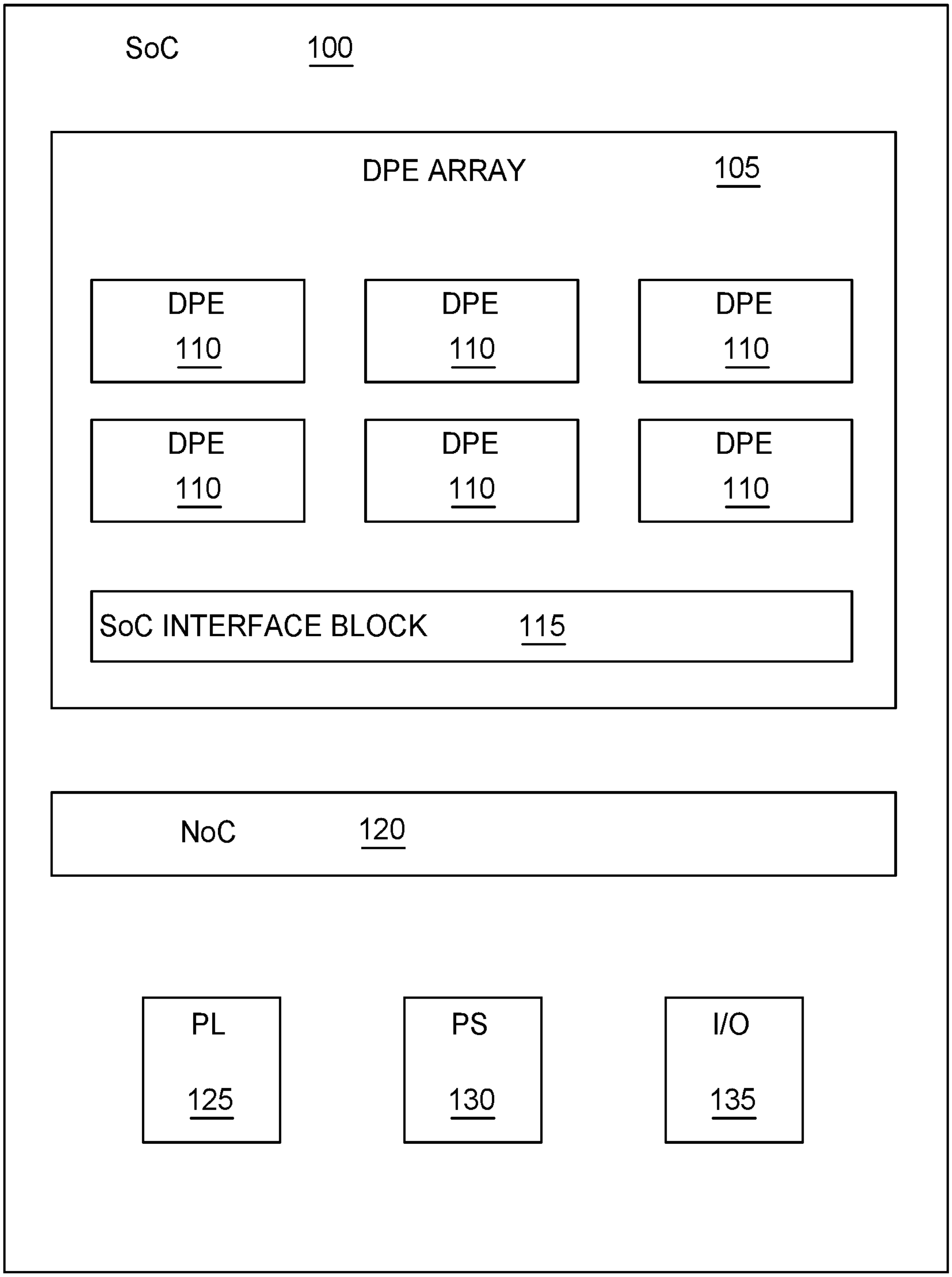
FIG. 1 is a block diagram of a SoC that includes a data processing engine array, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Examples herein describe techniques for generating dataflow graphs using source code for defining kernels and communication links between those kernels. In one embodiment, the graph is formed using nodes (e.g., kernels) which are communicatively coupled by edges (e.g., the communication links between the kernels). A compiler converts the source code into a bitstream and binary code which configures programmable logic and software-configurable hardened logic in a heterogeneous processing system of a SoC to execute the graph. Rather than requiring the programmer to understand in detail the programmable and software-configurable hardened hardware in the heterogeneous processing system, the compiler can use the graph expressed in source code to determine which kernels to assign to programmable logic blocks and which to assign to hardened logic blocks. Further, the compiler can, using the parameters provided in the graph source code, select the specific communication techniques to establish the communication links between the kernels (e.g., shared memory, windowing, direct memory access (DMA), etc.). Furthermore, the compiler can automatically determine whether synchronization should be used in a communication link and set up that synchronization without input from the programmer—i.e., without the programmer providing the details of the synchronization within the graph source code. Thus, the programmer can express the dataflow graph at a high-level (using source code) without understanding how the dataflow graph is implemented using the programmable and hardened hardware in the SoC. As a result, the graph source code is independent of a hardware design of a particular SoC and can be implemented (using the compiler) onto multiple different types of SoCs each having different hardware designs.

FIG. 1 is a block diagram of a SoC 100 that includes a data processing engine (DPE) array 105, according to an example. The DPE array 105 includes a plurality of DPEs 110 which may be arranged in a grid, cluster, or checkerboard pattern in the SoC 100. Although FIG. 1 illustrates arranging the DPEs 110 in a 2D array with rows and columns, the embodiments are not limited to this arrangement. Further, the array 105 can be any size and have any number of rows and columns formed by the DPEs 110.

In one embodiment, the DPEs 110 are identical. That is, each of the DPEs 110 (also referred to as tiles or blocks) may have the same hardware components or circuitry. Further, the embodiments herein are not limited to DPEs 110. Instead, the SoC 100 can include an array of any kind of processing elements, for example, the DPEs 110 could be digital signal processing engines, cryptographic engines, Forward Error Correction (FEC) engines, or other specialized hardware for performing one or more specialized tasks.

In FIG. 1, the array 105 includes DPEs 110 that are all the same type (e.g., a homogeneous array). However, in another embodiment, the array 105 may include different types of engines. For example, the array 105 may include digital signal processing engines, cryptographic engines, graphic processing engines, and the like. Regardless if the array 105 is homogenous or heterogeneous, the DPEs 110 can include direct connections between DPEs 110 which permit the DPEs 110 to transfer data directly as described in more detail below.

In one embodiment, the DPEs 110 are formed from software-configurable hardened logic—i.e., are hardened. One advantage of doing so is that the DPEs 110 may take up less space in the SoC 100 relative to using programmable logic to form the hardware elements in the DPEs 110. That is, using hardened logic circuitry to form the hardware elements in the DPE 110 such as program memories, an instruction fetch/decode unit, fixed-point vector units, floating-point vector units, arithmetic logic units (ALUs), multiply accumulators (MAC), and the like can significantly reduce the footprint of the array 105 in the SoC 100. Although the DPEs 110 may be hardened, this does not mean the DPEs 110 are not programmable. That is, the DPEs 110 can be configured when the SoC 100 is powered on or rebooted to perform different functions or tasks.

The DPE array 105 also includes a SoC interface block 115 (also referred to as a shim) that serves as a communication interface between the DPEs 110 and other hardware components in the SoC 100. In this example, the SoC 100 includes a network on chip (NoC) 120 that is communicatively coupled to the SoC interface block 115. Although not shown, the NoC 120 may extend throughout the SoC 100 to permit the various components in the SoC 100 to communicate with each other. For example, in one physical implementation, the DPE array 105 may be disposed in an upper right portion of the integrated circuit forming the SoC 100. However, using the NoC 120, the array 105 can nonetheless communicate with, for example, programmable logic (PL) 125, a processor subsystem (PS) 130 or input/output (I/O) 135 which may disposed at different locations throughout the SoC 100.

In addition to providing an interface between the DPEs 110 and the NoC 120, the SoC interface block 115 may also provide a connection directly to a communication fabric in the PL 125. In this example, the PL 125 and the DPEs 110 form a heterogeneous processing system since some of the kernels in a dataflow graph may be assigned to the DPEs 110 for execution while others are assigned to the PL 125. While FIG. 1 illustrates a heterogeneous processing system in a SoC, in other examples, the heterogeneous processing system can include multiple devices or chips. For example, the heterogeneous processing system could include two FPGAs or other specialized accelerator chips that are either the same type or different types. Further, the heterogeneous processing system could include two communicatively coupled SoCs.

Figure 2:
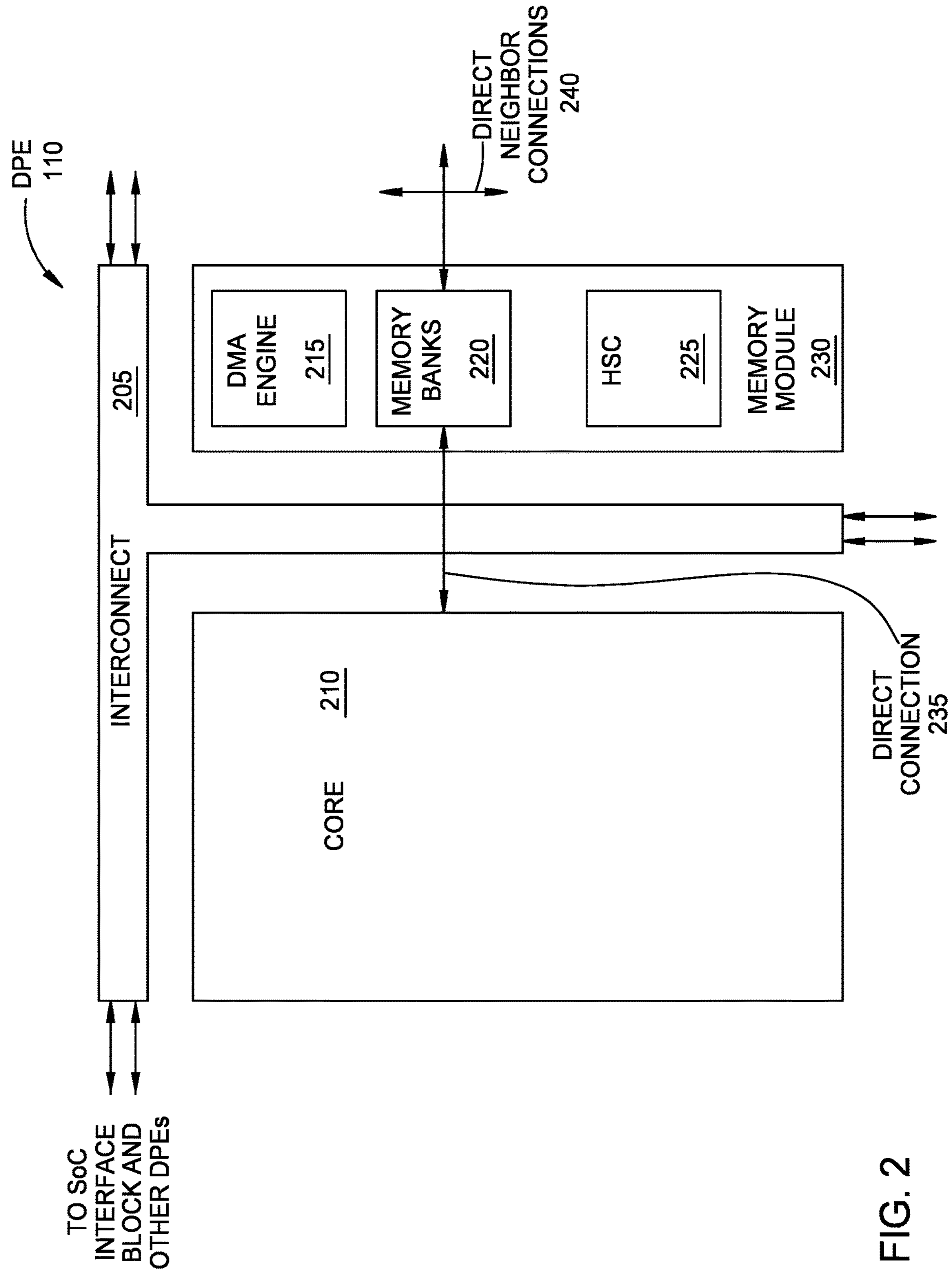
FIG. 2 is a block diagram of a data processing engine in the data processing engine array, according to an example.

This can be difficult for a programmer to manage since communicating between kernels disposed in heterogeneous or different processing cores can include using the various communication interfaces shown in FIG. 1 such as the NoC 120, the SoC interface block 115, as well as the communication links between the DPEs 110 in the array 105 (which as shown in FIG. 2).

In one embodiment, the SoC interface block 115 includes separate hardware components for communicatively coupling the DPEs 110 to the NoC 120 and to the PL 125 that is disposed near the array 105 in the SoC 100. In one embodiment, the SoC interface block 115 can stream data directly to a fabric for the PL 125. For example, the PL 125 may include an FPGA fabric which the SoC interface block 115 can stream data into, and receive data from, without using the NoC 120. That is, the circuit switching and packet switching described herein can be used to communicatively couple the DPEs 110 to the SoC interface block 115 and also to the other hardware blocks in the SoC 100. In another example, SoC interface block 115 may be implemented in a different die than the DPEs 110. In yet another example, DPE array 105 and at least one subsystem may be implemented in a same die while other subsystems and/or other DPE arrays are implemented in other dies. Moreover, the streaming interconnect and routing described herein with respect to the DPEs 110 in the DPE array 105 can also apply to data routed through the SoC interface block 115.

Although FIG. 1 illustrates one block of PL 125, the SoC 100 may include multiple blocks of PL 125 (also referred to as configuration logic blocks) that can be disposed at different locations in the SoC 100. For example, the SoC 100 may include hardware elements that form a field programmable gate array (FPGA). However, in other embodiments, the SoC 100 may not include any PL 125—e.g., the SoC 100 is an ASIC.

FIG. 2 is a block diagram of a DPE 110 in the DPE array 105 illustrated in FIG. 1, according to an example. The DPE 110 includes an interconnect 205, a core 210, and a memory module 230. The interconnect 205 permits data to be transferred from the core 210 and the memory module 230 to different cores in the array 105. That is, the interconnect 205 in each of the DPEs 110 may be connected to each other so that data can be transferred north and south (e.g., up and down) as well as east and west (e.g., right and left) in the array of DPEs 110.

Referring back to FIG. 1, in one embodiment, the DPEs 110 in the upper row of the array 105 relies on the interconnects 205 in the DPEs 110 in the lower row to communicate with the SoC interface block 115. For example, to transmit data to the SoC interface block 115, a core 210 in a DPE 110 in the upper row transmits data to its interconnect 205 which is in turn communicatively coupled to the interconnect 205 in the DPE 110 in the lower row. The interconnect 205 in the lower row is connected to the SoC interface block 115. The process may be reversed where data intended for a DPE 110 in the upper row is first transmitted from the SoC interface block 115 to the interconnect 205 in the lower row and then to the interconnect 205 in the upper row that is the target DPE 110. In this manner, DPEs 110 in the upper rows may rely on the interconnects 205 in the DPEs 110 in the lower rows to transmit data to and receive data from the SoC interface block 115.

In one embodiment, the interconnect 205 includes a configurable switching network that permits the user to determine how data is routed through the interconnect 205. In one embodiment, unlike in a packet routing network, the interconnect 205 may form streaming point-to-point connections. That is, the streaming connections and streaming interconnects (not shown in FIG. 2) in the interconnect 205 may form routes from the core 210 and the memory module 230 to the neighboring DPEs 110 or the SoC interface block 115. Once configured, the core 210 and the memory module 230 can transmit and receive streaming data along those routes. In one embodiment, the interconnect 205 is configured using the Advanced Extensible Interface (AXI) 4 Streaming protocol.

In addition to forming a streaming network, the interconnect 205 may include a separate network for programming or configuring the hardware elements in the DPE 110. Although not shown, the interconnect 205 may include a memory mapped interconnect which includes different connections and switch elements used to set values of configuration registers in the DPE 110 that alter or set functions of the streaming network, the core 210, and the memory module 230.

In one embodiment, streaming interconnects (or network) in the interconnect 205 support two different modes of operation referred to herein as circuit switching and packet switching. In one embodiment, both of these modes are part of, or compatible with, the same streaming protocol—e.g., an AXI Streaming protocol. Circuit switching relies on reserved point-to-point communication paths between a source DPE 110 to one or more destination DPEs 110. In one embodiment, the point-to-point communication path used when performing circuit switching in the interconnect 205 is not shared with other streams (regardless whether those streams are circuit switched or packet switched). However, when transmitting streaming data between two or more DPEs 110 using packet-switching, the same physical wires can be shared with other logical streams.

The core 210 may include hardware elements for processing digital signals. For example, the core 210 may be used to process signals related to wireless communication, radar, vector operations, machine learning applications, and the like. As such, the core 210 may include program memories, an instruction fetch/decode unit, fixed-point vector units, floating-point vector units, arithmetic logic units (ALUs), multiply accumulators (MAC), and the like. However, as mentioned above, this disclosure is not limited to DPEs 110. The hardware elements in the core 210 may change depending on the engine type. That is, the cores in a digital signal processing engine, cryptographic engine, or FEC may be different.

The memory module 230 includes a direct memory access (DMA) engine 215, memory banks 220, and hardware synchronization circuitry (HSC) 225 or other type of hardware synchronization block. In one embodiment, the DMA engine 215 enables data to be received by, and transmitted to, the interconnect 205. That is, the DMA engine 215 may be used to perform DMA reads and write to the memory banks 220 using data received via the interconnect 205 from the SoC interface block or other DPEs 110 in the array.

The memory banks 220 can include any number of physical memory elements (e.g., SRAM). For example, the memory module 230 may be include 4, 8, 16, 32, etc. different memory banks 220. In this embodiment, the core 210 has a direct connection 235 to the memory banks 220. Stated differently, the core 210 can write data to, or read data from, the memory banks 220 without using the interconnect 205. That is, the direct connection 235 may be separate from the interconnect 205. In one embodiment, one or more wires in the direct connection 235 communicatively couple the core 210 to a memory interface in the memory module 230 which is in turn coupled to the memory banks 220.

In one embodiment, the memory module 230 also has direct connections 240 to cores in neighboring DPEs 110. Put differently, a neighboring DPE in the array can read data from, or write data into, the memory banks 220 using the direct neighbor connections 240 without relying on their interconnects or the interconnect 205 shown in FIG. 2. The HSC 225 can be used to govern or protect access to the memory banks 220. In one embodiment, before the core 210 or a core in a neighboring DPE can read data from, or write data into, the memory banks 220, the HSC 225 provides a lock to an assigned portion of the memory banks 220 (referred to as a "buffer"). That is, when the core 210 wants to write data, the HSC 225 provides a lock to the core 210 which assigns a portion of a memory bank 220 (or multiple memory banks 220) to the core 210. Once the write is complete, the HSC 225 can release the lock which permits cores in neighboring DPEs to read the data.

Because the core 210 and the cores in neighboring DPEs 110 can directly access the memory module 230, the memory banks 220 can be considered as shared memory between the DPEs 110. That is, the neighboring DPEs can directly access the memory banks 220 in a similar way as the core 210 that is in the same DPE 110 as the memory banks 220. Thus, if the core 210 wants to transmit data to a core in a neighboring DPE, the core 210 can write the data into the memory bank 220. The neighboring DPE can then retrieve the data from the memory bank 220 and begin processing the data. In this manner, the cores in neighboring DPEs 110 can transfer data using the HSC 225 while avoiding the extra latency introduced when using the interconnects 205. In contrast, if the core 210 wants to transfer data to a non-neighboring DPE in the array (i.e., a DPE without a direct connection 240 to the memory module 230), the core 210 uses the interconnects 205 to route the data to the memory module of the target DPE which may take longer to complete because of the added latency of using the interconnect 205 and because the data is copied into the memory module of the target DPE rather than being read from a shared memory module.

In addition to sharing the memory modules 230, the core 210 can have a direct connection to cores 210 in neighboring DPEs 110 using a core-to-core communication link (not shown). That is, instead of using either a shared memory module 230 or the interconnect 205, the core 210 can transmit data to another core in the array directly without storing the data in a memory module 230 or using the interconnect 205 (which can have buffers or other queues). For example, communicating using the core-to-core communication links may use less latency (or have high bandwidth) than transmitting data using the interconnect 205 or shared memory (which requires a core to write the data and then another core to read the data) which can offer more cost effective communication. In one embodiment, the core-to-core communication links can transmit data between two cores 210 in one clock cycle. In one embodiment, the data is transmitted between the cores on the link without being stored in any memory elements external to the cores 210. In one embodiment, the core 210 can transmit a data word or vector to a neighboring core using the links every clock cycle, but this is not a requirement.

In one embodiment, the communication links are streaming data links which permit the core 210 to stream data to a neighboring core. Further, the core 210 can include any number of communication links which can extend to different cores in the array. In this example, the DPE 110 has respective core-to-core communication links to cores located in DPEs in the array that are to the right and left (east and west) and up and down (north or south) of the core 210. However, in other embodiments, the core 210 in the DPE 110 illustrated in FIG. 2 may also have core-to-core communication links to cores disposed at a diagonal from the core 210. Further, if the core 210 is disposed at a bottom periphery or edge of the array, the core may have core-to-core communication links to only the cores to the left, right, and bottom of the core 210.

However, using shared memory in the memory module 230 or the core-to-core communication links may be available if the destination of the data generated by the core 210 is a neighboring core or DPE. For example, if the data is destined for a non-neighboring DPE (i.e., any DPE that DPE 110 does not have a direct neighboring connection 240 or a core-to-core communication link), the core 210 uses the interconnects 205 in the DPEs to route the data to the appropriate destination. As mentioned above, the interconnects 205 in the DPEs 110 may be configured when the SoC is being booted up to establish point-to-point streaming connections to non-neighboring DPEs to which the core 210 will transmit data during operation.

Figure 3A:
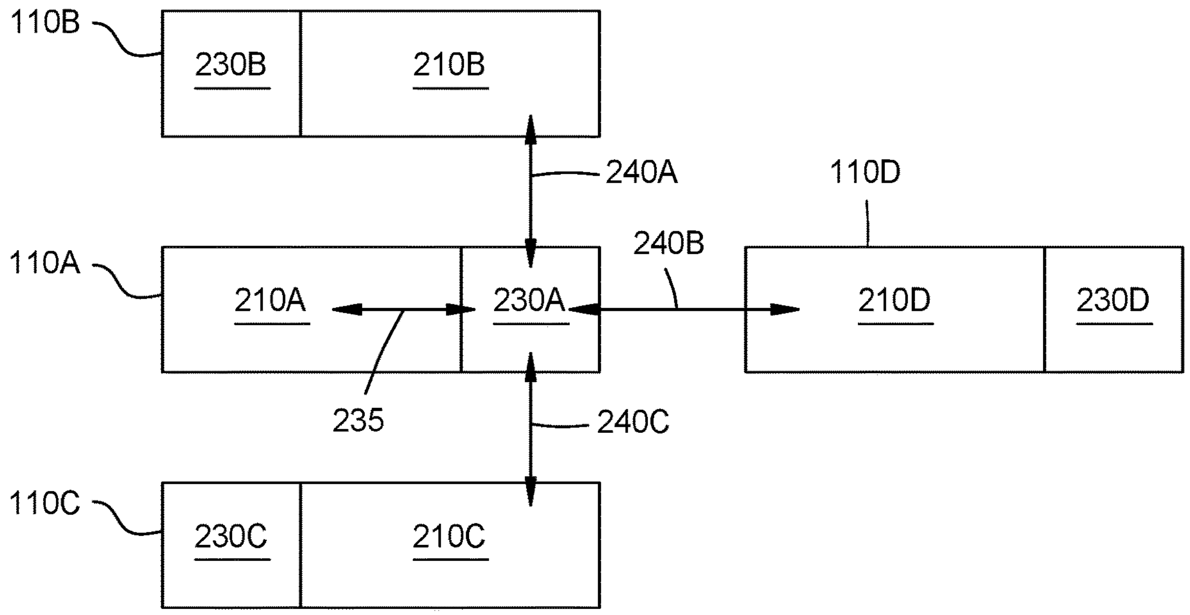
FIGS. 3A and 3B illustrate a memory module shared by multiple DPEs in a DPE array, according to an example.
Figure 3B:
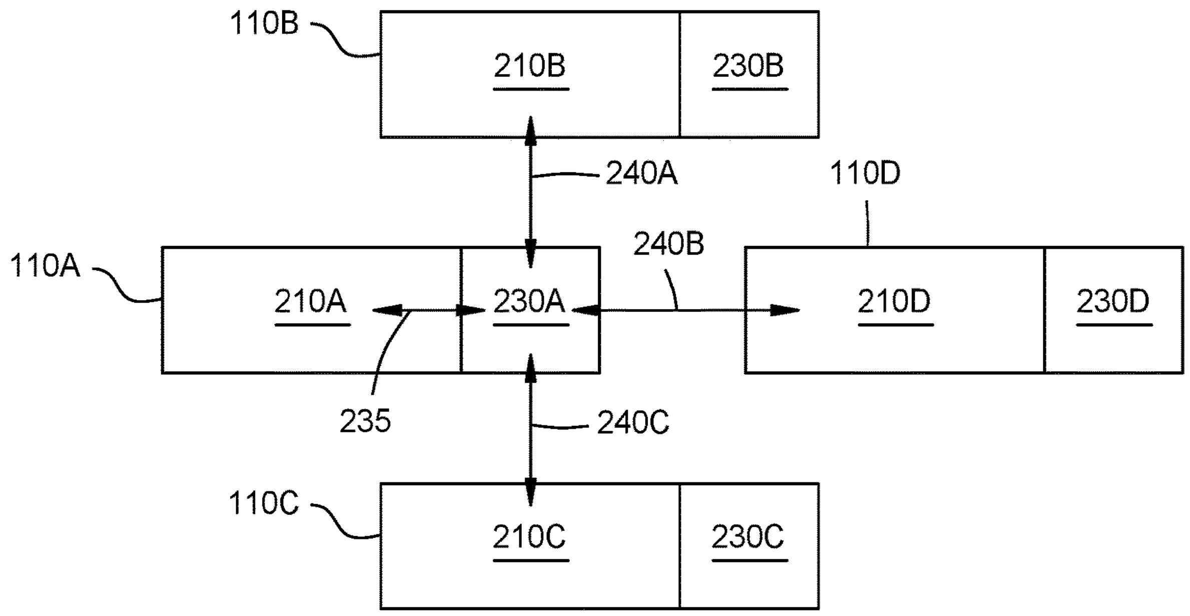

FIGS. 3A-3B illustrate a memory module 230A shared by multiple DPEs 110 in a DPE array, according to an example. As shown, the memory module 230A has direct connections to four cores—i.e., cores 210A-D. The memory module 230A is in the same DPE (i.e., DPE 110A) as the core 210A. As such, the direct connection 235 is an intra-engine connection. However, the memory module 230A is in a different DPE than the cores 210B-D. As such, the direct neighboring connections 240A-C are inter-engine connections since these connections 240 span across an interface between DPEs 110 in the array. For clarity, the interconnects in each of the DPEs 110 have been omitted.

In FIG. 3A, the memory module 230A in the DPE 110A is disposed to the right of the core 210A. The same is true for the DPE 110D located to the right of the DPE 110A (i.e., is east of the DPE 110A). As such, the core 210D in the DPE 110D directly neighbors the memory module 230A which makes establishing the direct neighboring connection 240B between the memory module 230A and the core 210D easier than if the memory module 230D were disposed to the left of the core 210D—i.e., if the memory module 230D were disposed between the memory module 230A and the core 210D.

Unlike the DPEs 110A and 110D, in the DPEs 110B and 110C, the cores 210B and 210C are disposed to the right of the memory modules 230B and 230C. As a result, the cores 210B and 210C are disposed directly above and directly below the memory module 230A (i.e., the cores 210B and 210C are north and south of the memory module 230A). Doing so makes establishing the direct neighboring connections 240A and 240C between the shared memory module 230A and the cores 210B and 210C easier than if the cores 210B and 210C were disposed to the left of the memory modules 230B and 230C. Using the arrangement shown in FIG. 3A, the memory module 230A has direct connections 235 and 240 to the cores 210A-D that are located in the same DPE and neighboring DPEs which means the memory module 230A is a shared memory for the DPEs 110A-D. Although FIG. 3A illustrates sharing the memory module 230A between four cores 210, in other embodiments the memory module 230A may be shared by more or fewer cores. For example, the memory module 230A may also have direct connections to neighboring DPEs that are arranged at a diagonal relative to the DPE 110A.

The arrangement of the DPEs 110 illustrated in FIG. 3A is just one example of a suitable arrangement of the DPEs 110 to provide direct connections to the memory module 230A from the neighboring cores 210. In FIG. 3B, the DPEs 110 in the different rows are staggered. That is, instead of the DPEs 110 in the same column being aligned, the DPEs 110 are offset. In this arrangement, the cores 210B and 210C are disposed to the left of the memory modules 230B and 230C (unlike what is shown in FIG. 3A) and still are directly above and beneath the shared memory module 230A by shifting the DPEs 110B and 110C to the right relative to the DPE 110A. As such, the direct connection 240A-C can be formed in the SoC to enable the memory module 230A to be shared by the cores 210A-D.

Moreover, although not shown in FIGS. 3A and 3B, the memory modules 230B-D may also be shared memory modules. For example, the memory module 230D may have direct connection to cores in DPEs that are disposed above, below, and to the right (i.e., to the north, south, and east) of the DPE 110D. In this manner, the memory module 230D can be shared with cores in neighboring DPEs. However, the memory modules 230 in DPEs disposed at the edges or periphery of the array may be shared by fewer numbers of cores (or may not be shared at all).

Figure 4:
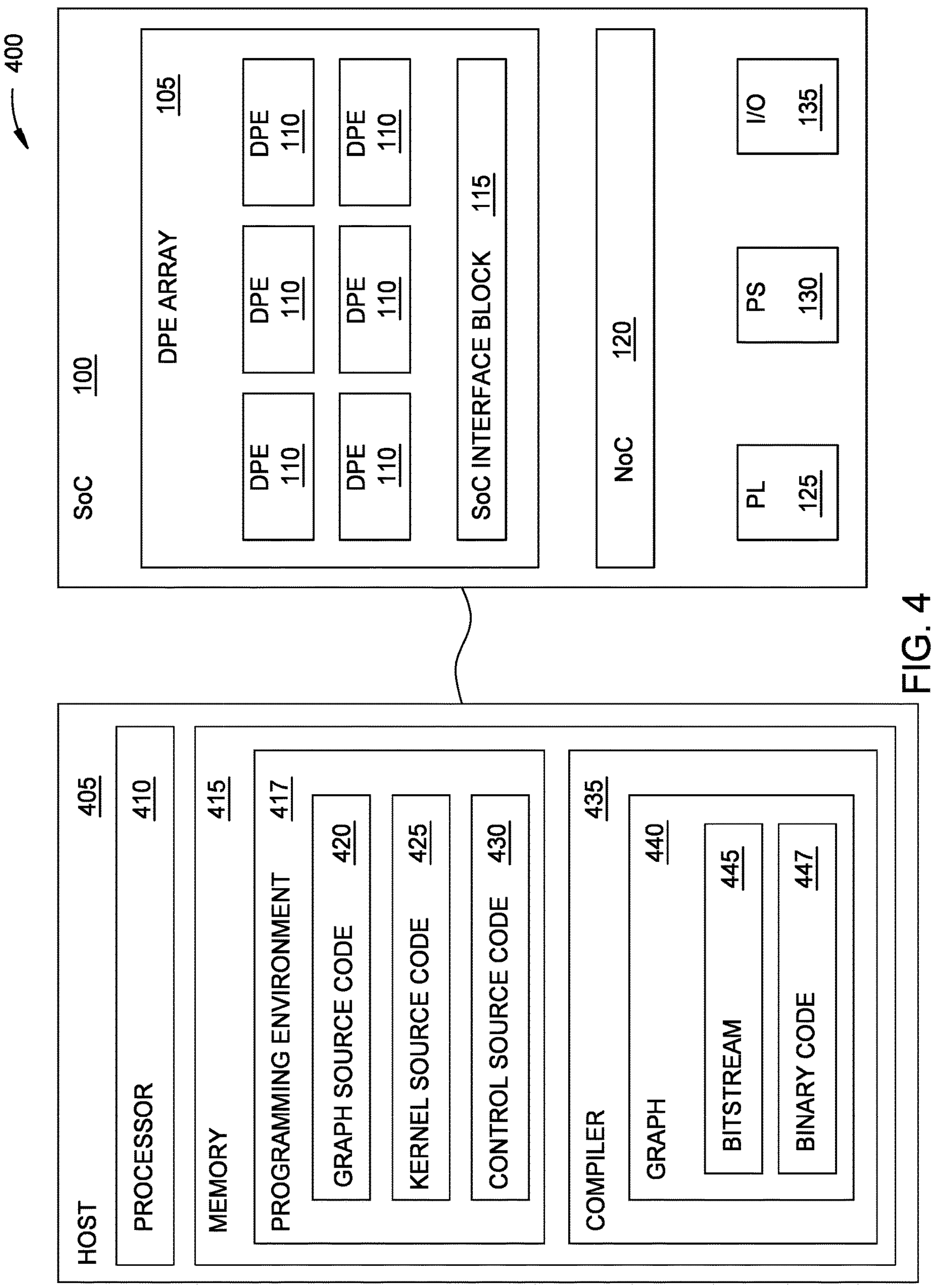
FIG. 4 is a block diagram of a computing system for implementing a dataflow graph on the SoC illustrated in FIG. 1, according to an example.

FIG. 4 is a block diagram of a computing system 400 for implementing a dataflow graph 440 on the SoC 100 illustrated in FIG. 1, according to an example. The system 400 includes a host 405 (e.g., a host computing system) which includes a processor 410 and memory 415. The processor 410 represents any number of processing elements which each can contain any number of processing cores. The memory 415 can include volatile and non-volatile memory elements. Moreover, the memory 415 can be disposed within the same apparatus (e.g., a server) or can be distributed across the computing system 400 (e.g., a cloud computing environment).

The memory 415 includes a heterogeneous programming environment 417 for generating graph source code 420, kernel source code 425, control source code 430. The memory 415 also includes a compiler 435. The graph source code 420 can be written in various types of object orientated programming languages (e.g., C++, Python, Javascript, Swift, Go, LabView, or Simulink). Generally, the graph source code 420 defines kernels (e.g., nodes) which are connected via communication links (e.g., edges). The combination of the kernels and the communication links form the graph 440.

One advantage of providing a heterogeneous programming environment 417 for defining a dataflow graph 440 using the source code 420 is that different aspects of compiling dataflow graphs on the heterogeneous processing system can be directly expressed and controlled in the heterogeneous programming environment 417. A programmer can start with a parallel definition (e.g., the graph) which the compiler 435 then implements in the hardware of the SoC 100. The graph 440 enables the data to flow between the nodes (e.g., the kernels) in a continuous pipelined manner. A node starts processing as soon as the data at its inputs is available, otherwise it stalls. Moreover, the graph 440 provides the programmer with significant freedom to map the computation and the data flows to DPEs 110 and programmable logic 125 in the SoC 100.

While various types of dataflow graphs can be used, in one embodiment, the semantics of the graph 440 established by the graph source code 420 is based upon the general theory of Kahn Process Networks which provides a computation model for deterministic parallel computation that is applied to the heterogeneous architecture in the SoC 100 (which includes both programmable and hardened blocks). Moreover, the graph source code 420 is tolerant for communication latencies between the nodes in the graph 440, and as a result, extends naturally to graphs that map to multiple super logic regions and multiple SoC devices (e.g., multiple FPGAs). For example, the graph source code 420 can include a first plurality of kernels which the compiler assigns to a first chip (e.g., a SoC, FPGA, etc.) and a second plurality of kernels the compiler assigns to a second chip. The first and second plurality of kernels can be part of the same dataflow graph, and as such, may communicate with each other when executed on the first and second chips.

Another advantage of using the source code 420 to define a dataflow graph is that a sequential program, in contrast, fixes the control flow and the order of computation. When using a dataflow graph, predictable and reproducible responses to input are obtained without a race condition. While there is a risk of deadlock, this can be solved or mitigated by managing the storage assigned to each node or kernel.

The kernel source code 425 can be written in various types of object orientated programming languages. The kernel source code 425 defines the attributes of a particular kernel or node in the dataflow graph 440. In one embodiment, the kernel source code 425 defines the operation of each kernel within the graph source code 420.

The control source code 430 can be written in various types of object orientated programming languages. In one embodiment, the control source code 430 defines a control program, that when executed, controls the execution of the graph 440 when implemented on the SoC 100. For example, the control source code 430 may control when the graph 440 executes, the number of iterations the graph 440 executes, and when the graph 440 stops executing. The control program generated from the control source code 430 can execute on the host 405 (e.g., in a datacenter solution) or within the SoC 100 (e.g., the PS 130).

The compiler 435 is a software application that can compile the source code 420, 425, and 430. For example, using the graph source code 420 (and other libraries not shown in FIG. 4), the compiler 435 can generate the graph 440 which can be implemented on the SoC 100 which will be described in more detail below. In one embodiment, the graph 440 includes a bitstream 445 that configures the programmable logic in the SoC 100 (e.g., the PL 125, NoC 120, SoC Interface block 115, and I/O 135) and binary code 447 (which can include many targeted commands) which configures the software-configurable hardened logic in the SoC 100 (e.g., the DPEs 110 and PS 130). The bitstream 445 and the binary code 447 may be transmitted over a memory bus to the SoC 100 to configure the SoC 100 to execute the graph 440.

Figure 5:
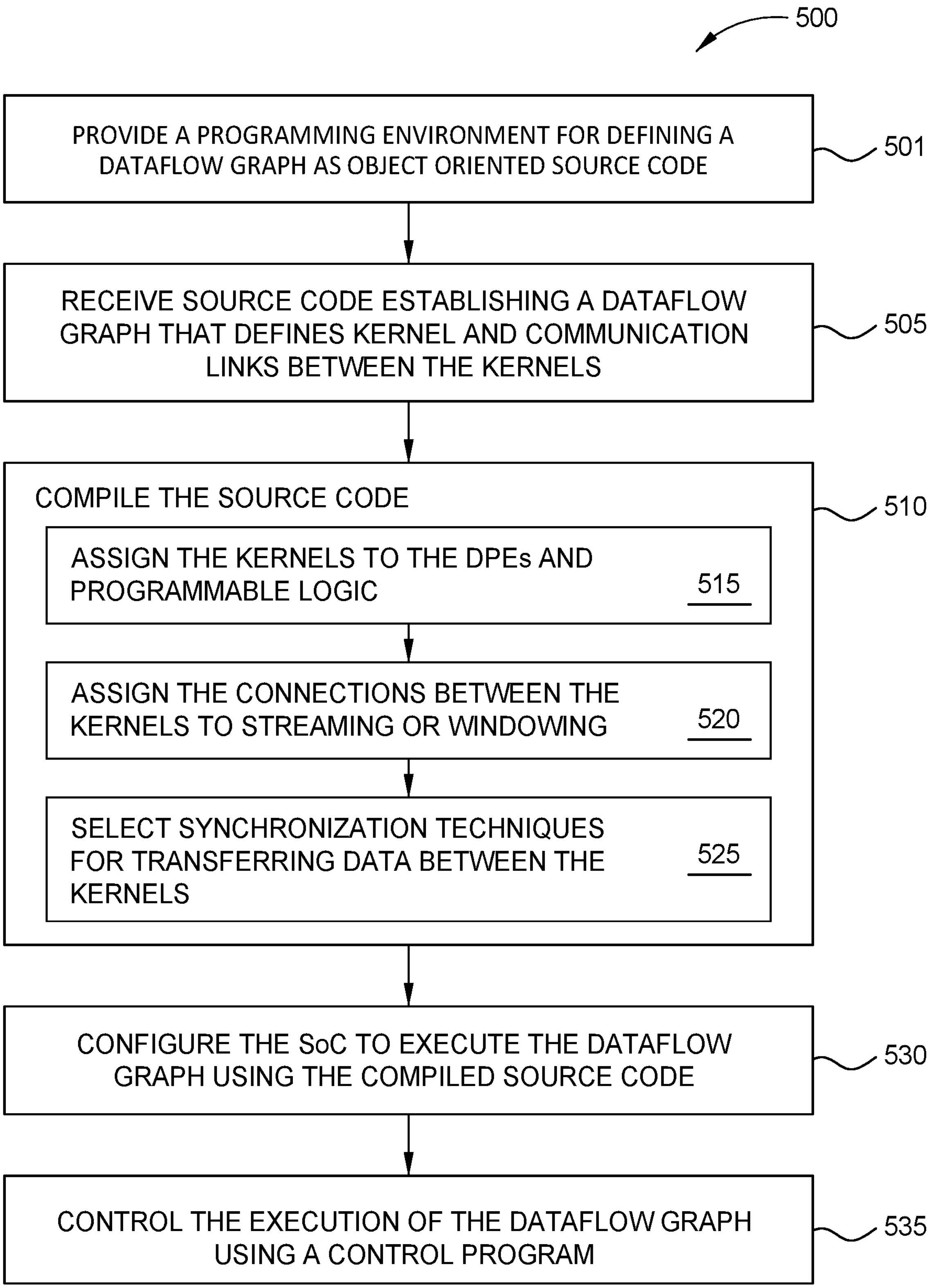
FIG. 5 is a flowchart for compiling source code to implement a dataflow graph on a SoC with programmable and non-programmable logic, according to an example.

FIG. 5 is a flowchart of a method 500 for compiling source code to implement a dataflow graph on a SoC with programmable logic and software-configurable hardened logic, according to an example. At block 501, the host provides a heterogeneous programming environment for defining a dataflow graph as object oriented source code (e.g., C++, Python, Javascript, Swift, Go, LabView, or Simulink). That is, the programmer uses the heterogeneous programming environment (which is described in more detail in FIG. 6) to generate source code that defines the dataflow graph. At block 505, the compiler receives the source code establishing the dataflow graph that defines kernel and communication links between the kernels. In one embodiment, the source code received by the compiler includes graph source code.

For clarity, FIGS. 6-11 are discussed in tandem with the blocks described in method 500.

FIG. 6 is graph source code 420 for defining a dataflow graph, according to an example. That is, FIG. 6 is one example of graph source code 420 generated in a heterogeneous programming environment that permits a programmer to define a plurality of kernels and communication links for establishing a dataflow graph. The source code 420 using a namespace "Namespace A" which may reference one or more libraries which can be used to define a dataflow graph in the source code 420. In one embodiment, the graph source code 420 can be thought of establishing a data structure in the heterogeneous programming environment which the programmer builds using the kernels 605 and communication links 620.

In this example, the graph source code 420 includes six kernels 605: a, b, c, d, e, and f. The kernels 605 are defined within the class "radio". While FIG. 6 illustrates source code 420 for performing a radio function, as mentioned above, the techniques described herein can be used for a plurality of different functions such as radar, vector operations, machine learning applications, and the like.

The source code 420 includes wrappers 610A-F that define the function or operation performed by each of the kernels 605. The wrappers 610 create mechanisms to invoke the corresponding C++ function (e.g., polarclip, feedback, equalizer, fir_tap11, fir_tap7, and scale). That is, the wrappers 610 permit the programmer to define the kernel using the example functions which may be part of another C++ library. In this example, the kernels 605 are functions calls rather than single instructions. In one embodiment, a kernel 605 executes only when the kernel 605 receives the data from all its triggering inputs and executes in a non-blocking manner to produce output which can be transmitted to a downstream kernel 605. A kernel may also block during execution on a stream input if the stream data is not present when accessed.

One advantage of abstracting the kernels as function calls using the wrappers 610 is that doing so means the programmer can express kernels that are to be executed on the DPEs or the programmable logic in the same uniform framework. The programmer writes the kernels 605 differently but the kernels 605 are packaged in the same way and can be expressed in the same framework. The programmer does not need to worry about integrating kernels assigned to the DPE with kernels assigned to the PL fabric. Here, the programmer selects or indicates the types of communication links 620 in the graph source code 420 and all the synchronization between the kernels 605 using those types of communication links 620 is handled by the compiler.

The source code 420 also includes constraints 615 which include instructions to limit how the compiler maps the objects defined in the source code 420 (e.g., the kernels 605 and the communication links 620) to the hardware in the SoC. In this example, the constraints 615 instruct the compiler to assign the kernels a and f to the fabric (e.g., the programmable logic) in the SoC rather than assigning these kernels to a DPE. For reasons described below, assigning the kernels a and f to the fabric rather than the DPEs can offer performance improvement. Thus, while the graph source code 420 does not require the programmer to assign the kernels 605 to the hardware in the SoC (and thus the programmer does not need to understand the underlying hardware architecture of the SoC), the namespace provided to the programmer permits her to use the constraints 615 to instruct the compiler how to assign one or all of the kernels 605 if the programmer knows doing so improves performance.

The communication links 620 define how data is communicated between the kernels 605. For example, the communication link 620A indicates that streaming data is converted into window data which has a length of 64 bytes. Further, each window is transmitted with an 8 byte overlap. However, for communication link 620B, windowing data of length 32 bytes is transmitted between kernel b and kernel c without any overlapping data. The details of windowing data (and overlapping the windows) are described in more detail below.

Further, each communication link 620 defines which port on the upstream kernel is connected to which port on the downstream kernel. For example, in link 620A, the output port a.out[0] of kernel a is coupled to the input port b.in[0] of kernel b. Each kernel can have multiple input ports and multiple output ports. For example, in communication link 620D, a first output port d.out[1] of kernel d is coupled to the input port e.in[0]. Also, in communication link 620F, a second output port d.out[0] of kernel d is coupled to the input port f.in[0].

Like how the graph source code 420 abstracts the kernels 605 so they can be expressed in the same uniform framework, the source code 420 can abstract (or hide) synchronization on the communication links 620 from the programmer. As described in more detail below, the compiler can select the optimal communication technique to transmit data between the kernels 605 based on whether the kernels 605 are in the fabric or in the DPE array, or whether the kernels 605 are neighbors in the DPE array.

In one embodiment, the ability to define the kernels 605, wrappers 610, constraints 615, and communication links 620 in the graph source code 420 are tools provided by the heterogeneous programming environment (and supported by the libraries in the namespace) that permit a programmer to generate object orientated source code that implements a dataflow graph.

Figures 7, 8:
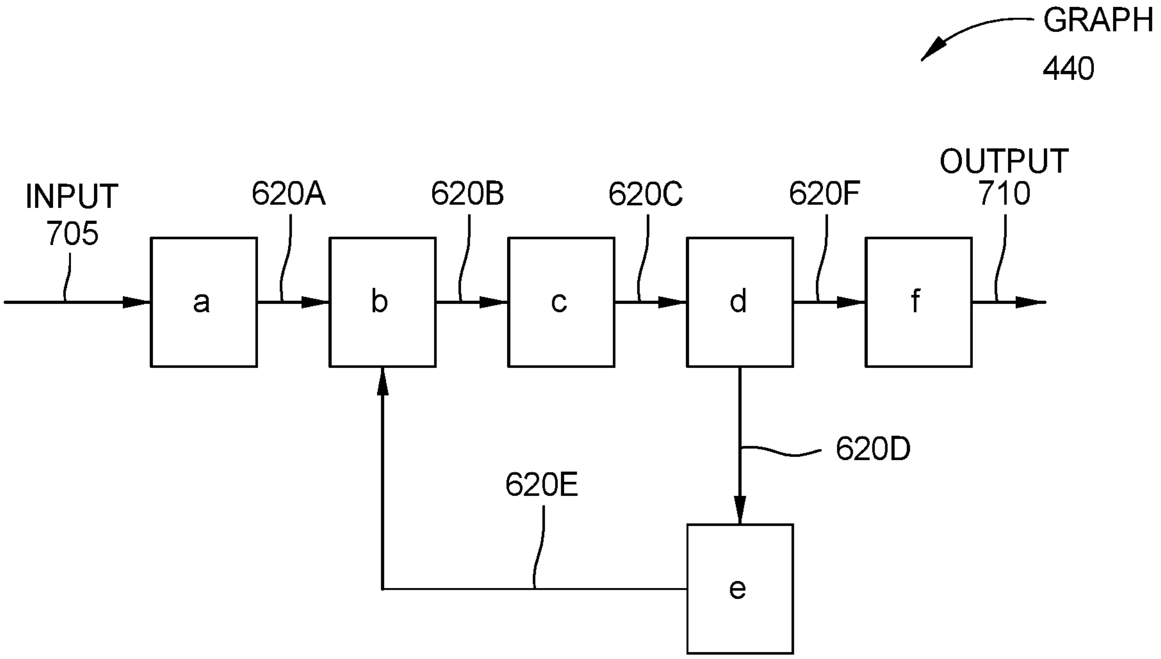
FIG. 7 illustrates a dataflow graph defined by the source code in FIG. 6, according to an example.
FIG. 8 is kernel source code for defining a kernel in a dataflow graph, according to an example.

FIG. 7 illustrates a dataflow graph 440 defined by the source code 420 in FIG. 6, according to an example. That is, the graph 440 is a graphical representation of the graph defined by the graph source code 420. As shown, the graph 440 includes the six kernels a-f that are communicatively coupled using the communication links 620A-E. Further, the graph 440 includes an input 705 which transfers data into the kernel a and an output 710 that receives data from the output of the kernel f. The data received at the input 705 can be provided by, e.g., an application executing on the host, a radio transceiver, a camera, or from a file or database. The output 710 can transmit data processed by the graph 440 to the host or into a file or database.

FIG. 7 is an abstract view of the graph 440 where the kernels (e.g., nodes) are coupled by the links 620 at respective input and output ports. That is, FIG. 7 illustrates the data flow between the kernels a-f using the links 620A-F but does not illustrate the hardware implementation on which the kernels are executed or the particular type of communication link 620 being used—e.g., shared memory, NoC, DMA, etc. Nonetheless, the programmer can design the graph 440 at the abstract view illustrated in FIG. 7 and then the compiler can implement the kernels a-f and the communication links 620 in the hardware of the SoC.

FIG. 8 is kernel source code 425 for defining a kernel in a dataflow graph, according to an example. In one embodiment, the wrapper 610 in the source code in FIG. 6 permits the arguments of the function defined by the kernel to be accessed as ports. In FIG. 8, the kernel source code 425 includes arguments 805 that specify a pointer (i.e., *inputw) to the input data and a pointer (*outputw) to the output data. When two kernels are communicatively coupled by a link as described above, the compiler can allocate data memory which is supplied to the kernel (or the function called by the kernel) when the kernel is called. In one embodiment, the kernel operates on the input data provided by the arguments 805 using an application programming interface (API).

In FIG. 8, the kernel source code 425 includes window APIs for processing the input data before it is outputted. For example, the window_readincr is an API which reads the next window using the pointer inputw. Once the operation is performed, which is illustrated here generally as performing math using sbuff, another API can be used to output the processed data—e.g., window_writeincr.

In one embodiment, the programmer generates kernel source code for each kernel defined in the graph source code. However, if the graph source code has multiple instances of the same kernel, these multiple instances can be defined using the same kernel source code.

Returning to the method 500, at block 510 the compiler compiles the source code (e.g., the graph, kernel, and control source code). For ease of explanation, this compilation is divided into at least three sub-blocks. At block 515, the compiler assigns the kernels to the DPEs and programmable logic in the SoC. The compiler can use constraints provided by the programmer in the source code (e.g., the constraints 615 in FIG. 6), but absent constraints, can assign the kernels in the graph source code to the DPEs and the programmable logic in the SoC.

In one embodiment, the compiler evaluates the graph to determine how to assign the kernels to the hardware in the SoC. For example, if two kernels are communicatively coupled to each other in the graph, the compiler may assign the kernels to neighboring DPEs in the DPE array to take advantage of faster communication protocol such as shared memory between the DPEs. Further, the compiler may determine the cycle count and the fraction of time used by each of the kernels to determine whether multiple kernels can be assigned to the same DPE.

Figure 9:
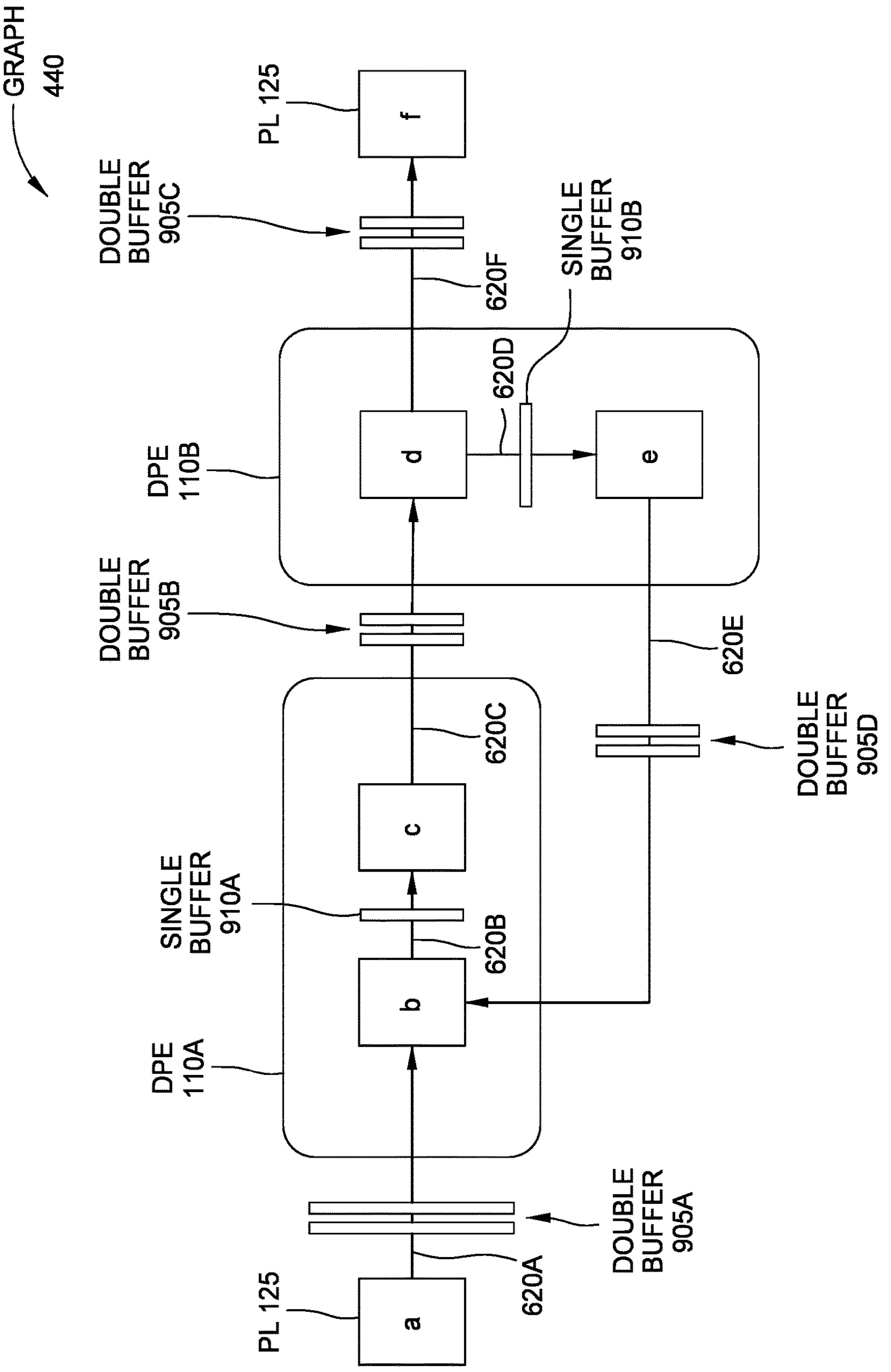
FIG. 9 is an abstract view of implementing the dataflow graph in FIG. 7, according to an example.

FIG. 9 is an abstract view of implementing the dataflow graph 440 in FIG. 7, according to an example. FIG. 9 illustrates the kernels a-f as well as the communication links 620. Further, FIG. 9 illustrates the hardware on which the kernels are assigned in the SoC. As shown, the kernels a and f are disposed in the PL 125, the kernels b and c are implemented in the DPE 110A, and the kernels d and e are implemented in the DPE 110B.

In one embodiment, the compiler chose to place the kernels a and fin the PL 125 based on the constraint provided in the graph source code. However, in another embodiment, the compiler may have recognized these kernels as input/output kernels which may be better suited for being implemented in programmable logic rather than the DPEs.

The compiler may have assigned the kernels b and c to the same DPE 110A using the estimated fraction of the cycle count of each kernel or in response to a constraint from the programmer. This is referred to generally as clustering. For example, if the kernel b uses only 40% of the cycle count of the DPE 110A and the kernel c uses only 55% of the cycle count, then the compiler can place them on the same DPE 110A. In another example, the programmer may use a constraint to instruct the compiler to place the kernels b and c on the same DPE 110A. That way, although the programmer describes the graph as a parallelized data structure, the programmer can use the estimate cycle counts of the kernels to force some of the kernels to be sequential—i.e., assigned to the same DPE. That is, because each DPE can execute only one task at a time (i.e., are not parallelized), placing two different kernels on the same DPE means only one of the kernels can execute at a time rather than the scenario where the kernels are assigned to their own DPEs. However, this clustering would still meet the overall cycle count.

Returning to the method 500, at block 520 the compiler assigns the connections between the kernels to streaming or windowing. In one embodiment, these connections are controlled by the communication links defined in the graph source code. That is, the programmer can indicate how data should be passed between each pair of kernels. In another example, the compiler assigns a DMA engine 215 in the memory module 230 of one DPE 110 to transfer window data from memory bank 220 to another DPE 110 through the interconnect 205. In yet another example, the compiler assigns a stream channel on the interconnect 205 and a stream channel on the receiving core 210 or the receiving DMA engine 215.

At block 525, the compiler selects synchronization techniques for transferring data between the kernels. This is illustrated in FIG. 9 where the communication links 620A-F (which, in this example, use windowing) include either a double buffer 905 or a single buffer 910 to transmit data between the kernels. If the kernels are on different (or heterogeneous) processing cores (e.g., PL 125 versus the DPEs 110) as in the case with the link 620A between kernels a and b and the link 620F between the kernels d and f, the compiler assigns a double buffer 905. Moreover, if the kernels are on different DPEs as in the case with the link 620C between kernels c and d and the link 620E between kernels e and b, the compiler again uses a double buffer 905. However, for transferring data between kernels on the same DPE as in the case of the link 620B between kernels b and c and the link 620D between kernels d and e, the compiler can assign a single buffer 910. As described below, single buffering may provide lower latency than double buffering.

The compiler also handles synchronization between the kernels when performing double or single buffering. For example, when performing double buffering, the compiler can establish a locking protocol for accessing the double buffers 905 which may not be needed when performing single buffering (e.g., when the kernels are on the same DPE 110). In another example, the compiler may select a ping/pong synchronization technique for the double buffers 905. In any case, the synchronization can be established by the compiler using the parameters provided by the programmer in the source code.

Returning to the method 500, at block 510, the compiler transmits a bitstream and/or binary code (e.g., a series of memory-mapped store transactions) for configuring the SoC to execute the dataflow graph using the compiled source code. That is, the SoC can receive the bitstream/binary code and then execute the graph using the hardware elements stipulated by the compiler. The compiler can determine where each kernel should be placed in the SoC, the type of communication links between those kernels, and the synchronization used by the communication links.

Figure 10:
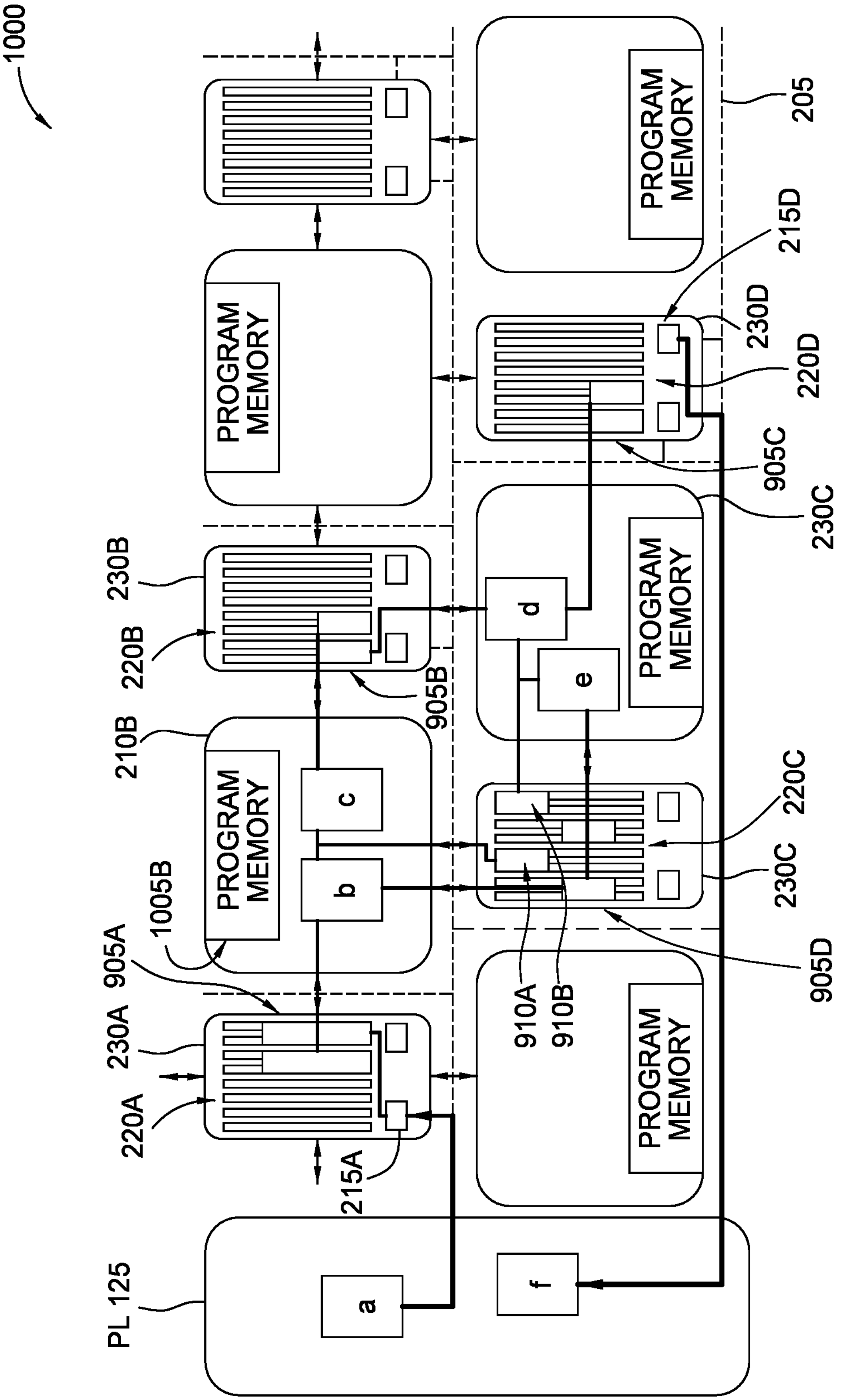
FIG. 10 is a hardware view of implementing the dataflow graph in FIG. 7, according to an example.

FIG. 10 is a hardware view 1000 of implementing the dataflow graph in FIG. 7 in a SoC, according to an example. That is, the hardware view 1000 illustrates a portion of the SoC used to implement the dataflow graph illustrated in FIG. 7. In this example, FIG. 7 illustrates a part of the SoC that includes the PL 125 and at least a portion of the DPEs in the DPE array which includes five cores 210 and five memory modules 230.

The kernels a and f are formed using configurable logic blocks (CLBs) in the PL 125. The kernel a is communicatively coupled to the memory module 230A via the interconnect 205. Although not shown, this communication link between kernel a and the memory module 230A may also include the NoC and the SoC interface block which permits a core 210 in the DPE array to communicate with other hardware modules in the SoC (e.g., the PL 125). In this embodiment, the kernel a transmits data to a DMA engine 215A in the memory module 230A which stores the received data into the double buffer 905A in the memory banks 220A. Thus, the compiler has decided to implement the communication link 620A illustrated in FIG. 9 by assigning the double buffer 905A to the memory banks 220A. Using DMA writes, the kernel a can store data in the double buffer 905A which can then be accessed by the kernel b hosted on the core 210B.

In this example, the double buffer 905A is assigned four of the banks in the memory banks 220A. In one embodiment, each memory bank holds 128 bytes which means that the total size of the double buffer 905A is 512 bytes. However, the compiler can assign more memory banks or fewer memory banks to the double buffer 905A depending on the expected needs of the kernels a and b. The kernel a can write data into two of the memory banks 220A in the double buffer 905A while the kernel b is reading data out of the other two memory banks 220A in the buffer 905A. In one embodiment, the compiler establish a ping/pong synchronization protocol between the kernels a and b so that the kernels do not try to access the same pair of memory banks. As mentioned above, the compiler can handle the synchronization protocol so that the kernel a on the PL 125 can communicate with the kernel b on the core 210B with only the programmer indicating the type of communication (e.g., windowing or streaming) that should occur between these kernels in the graph source code.

In one embodiment, because the core 210B which host the kernel b directly neighbors the memory module 230A, kernel b can directly access the double buffer 905A without having to the use the interconnect 205 (unlike kernel a). Thus, when assigning the double buffer 905A and the kernel b to hardware elements, the compiler selected a memory module 230A and core 210B which directly neighbor each other so that the kernel b can use the direct connection between the core 210B and the memory module 230A which has higher throughput than using the interconnect 205.

Because the kernels b and c are hosted or assigned to the same core 210B as shown in FIG. 9, the compiler attempts to assign the single buffer 910A to a neighboring memory module 230. In this case, the compiler assigned the single buffer 910A to the memory module 230C but could have used any of the neighboring memory modules—e.g., modules 230A or 230B. The compiler may have selected the memory module 230C rather than the modules 230A or 230B so that these memory modules have more available space to be used by cores further north in the array (not shown). Regardless of the reason, the kernels b and c can use the direct connection between the core 210B and the memory module 230C to transfer data into and out of the single buffer 910A. Because the kernels b and c are assigned to the same core 210B and as a result are executed sequentially rather in parallel, a single buffer 910A rather than a double buffer is sufficient since only one of the kernels is being executed by the core 210B at any given time. In this example, the single buffer 910A includes two banks of the memory banks 220C but the compiler can assign more banks or fewer banks depending on the expected needs of the kernels b and c.

For the inter-core communication link between kernel c and kernel d (which is illustrated as communication link 620C in FIG. 9), the compiler assigns the double buffer 905B to the memory banks 220B in the memory module 230B. As above, the compiler may establish a ping/pong synchronization protocol for the kernels c and d to simultaneously write and read two respective pairs of memory banks 220B in the double buffer 905B. Moreover, by using a memory module 230B which neighbors both the core 210B which hosts kernel c and the core 210C which hosts the kernel d, the compiler takes advantage of the direct connections these cores 210B-C have to the memory module 230B for reading and storing data in the double buffer 905B.

For the intra-core communication link between kernels d and e (which is illustrated as communication link 620D in FIG. 9), the compiler assigns the single buffer 910B to the memory module 230C. Like with the communication link between the kernels b and c, the single buffer 910B is sufficient since the kernels d and e are executed sequentially on the core 210C.

For the inter-core communication link between kernels e and b (which is illustrated as communication link 620E in FIG. 9), the compiler assigns the double buffer 905D to the remaining four memory banks 220C in the memory module 230C which are not being used by the single buffers 910A and 910B. The compiler can again establish a synchronization protocol between the kernels b and e for accessing the double buffer 905D.

For the heterogeneous communication link between kernels d and f (which is illustrated as communication link 620F in FIG. 9) where the kernels are hosted on different types of processing cores (e.g., the PL 125 and the DPE containing the core 210C), the compiler assigns the double buffer 905C to the memory banks 220D in the memory module 230D. The kernel d can access the double buffer 905C using the direct connection between the core 210C and the memory module 230D. However, because the kernel f is hosted on the PL 125 rather than one of the cores 210, the kernel f can access the double buffer 905C using the DMA engine 215D and the interconnect (as well as the NoC and the SoC interface buffer which are not shown). The compiler can again establish a synchronization protocol between the kernels d and f to permit them to access the double buffer 905C in parallel.

While FIG. 10 illustrates placing kernels in the DPE array that communicate with each other either in the same core 210 or in cores 210 that have direct connections to the same memory module, in other embodiments the compiler may place two kernels on cores that do not have direct connections to the same memory module 230. That is, the compiler may assign two kernels that directly communicate in the graph to two non-neighboring cores 210. In that case, the compiler may configure the kernels to perform DMA read/writes or a streaming connection using the interconnect 205

(similar to the kernels located in the PL 125) in order to communicate between the kernels rather than using shared memory.

In this manner, the compiler can determine where to place the kernels in the heterogeneous system, determine the type of communication links between the kernels (whether double buffer, single buffer, windowing, or streaming), and establish a synchronization protocol between the kernels using the parameters (e.g., the parameters defining the communication links) defined by the programmer in the source code. However, as mentioned above, the programmer can provide optimization instructions to the compiler using constraints if the programmer knows beforehand an optimal solution for implementing the graph defined in the source code on the SoC.

Figures 11, 12:
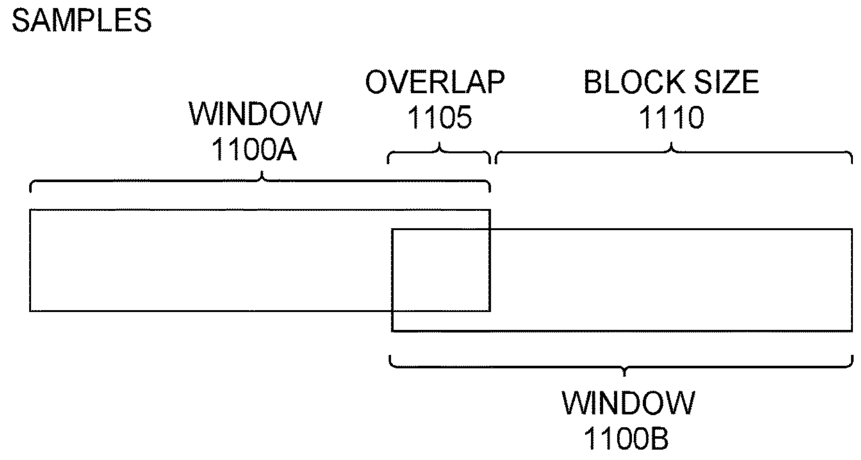
FIG. 11 illustrates overlapping windows used when transmitting data between kernels, according to an example.
FIG. 12 is control source code defining a control program for a dataflow graph, according to an example.

FIG. 11 illustrates overlapping windows 1100 used when transmitting data between kernels, according to an example. In one embodiment, the overlapping windows 1100 may be formed from streaming data that is received at one kernel (e.g., kernel a in FIG. 10) which then chunks up the data to generate the overlapping windows 1100 illustrated in FIG. 11. In another example, the kernel may have received overlapping windows from an upstream kernel and then transmits overlapping windows to a downstream kernel. In one embodiment, the window 1100A is stored in one of the double buffers 905A-D and the window 1100B is in the other buffer due to ping-pong synchronization. The compiler is then responsible for ensuring that the overlap 1105 is copied from one buffer to the other before the next invocation of the kernel.

Overlapping windows 1100 may be useful in some embodiments but not in others. For example, overlapping windows 1100 can be useful in wireless domain so the SoC can maintain the state of a kernel between executing different windows. In one embodiment, after a core finishes executed the kernel, the registers associated with the kernel are cleared and thus the state of the kernel is lost. However, by providing an overlap 1105 between the windows 1100A and 1100B where the data in the overlap 1105 is the same, the kernel can regain the state it finished processing the window 1100A when the kernel then begins to process the new data in the window 1100B. Put differently, by processing the overlap 1105 in the window 1100B (which contains the last samples in the window 1100A), the kernel regains the state it had at the end of processing the window 1100A. The kernel can then begin to process the new data in the window 1100B which was not in the window 1100A. Thus, the block size 1110 of the window 1100B indicates the new data being processed by the kernel that was not in the previous window 1100A. In this manner, the graph can use windows 1100 (which can reduce stalls at the kernels relative to streaming data) to process the received data but still maintain an infinite stream illusion by using the overlap 1105.

If a communication link between kernels uses windows (rather than streaming), in one embodiment, the receiving kernel does not process the data until a window 1100 of data is received from all its inputs, which makes processing data non-blocking. Once all the windows 1100 of data are received, the kernel processes the data without being stalled for further data and outputs a window to the downstream kernel or kernels. For example, the kernel d in FIG. 9 outputs a window 1100 of data to both the kernels f and e in parallel using the communication links 620F and 620D, respectively. The window 1100 of data outputted by the kernel d to the kernels f and e can be the same data or different data.

In another embodiment, the user can program a kernel to determine when it receives input data or outputs data, rather than waiting until all the windows are received or all the data is ready to be outputted. For example, referring back to FIG. 6, the communication link 620E is asynchronous where the source code defining kernel b determines when it receives data from the kernel e.

Returning to the method 500, a control program controls the execution of the dataflow graph on the SoC. That is, once the kernels and communication links have been assigned to the various hardware components and configured as illustrated in FIG. 10, the control program can provide instructions to the SoC for controlling the execution of the graph. As mentioned above, the control program can execute on a host computing system (as may be preferably in a datacenter) or within the PS of the SoC. In one embodiment, the control program is compiled using control source code.

FIG. 12 is control source code 430 defining a control program for a dataflow graph, according to an example. The source code 430 provides connections 1205 indicating to the compiler how data should be read into the graph and read out from the graph. The main class includes control APIs for initializing the graph (e.g., init( )), running the graph (e.g., run( )), and ending the graph (e.g., end( )). For example, the programmer can use the control source code 430 to indicate the number of iterations the graph should run before stopping. This may be useful for debug purposes. However, in other examples, the control program may permit the graph to operate indefinitely depending on the application. These control APIs are discussed in more detail later.

In one embodiment, the programmer may want large look-up tables (LUT) that exceed the size of the memory modules. Once the compiler identifies a large LUT that is too big for any of the memory modules in the DPE array, the compiler can spread the LUT across multiple memory modules. The compiler can allocate the LUT directly onto the array. The programmer can declare the LUT as static data and as an array parameter and connect the static data and the array parameter to a kernel. The compiler treats the LUT as internal data to the kernel (similar to a coefficient table). This declaration of the LUT is in the graph and gets allocated as a graph component. In one embodiment, the large LUTs are not double buffered and are only accessible by one kernel at a time.

In one embodiment, kernels can read/write directly to streams from cores in the DPEs. In the kernel source code, the streams can be declared as function parameters. If data is not available on a streaming port in the core, the kernel can stall (and thus, does not need a locking mechanism). It is an element by element synchronization implemented by the hardware of the stream itself, although the core can stall because no input data is available, there is a memory conflict on a bank, or an output buffer is full.

In one embodiment, if a kernel requires more cycle count than any on core can provide, it is split between cores and cascade streams are used to connect the sub-divided kernel. In the source code, the programmer expresses multiple kernels that are chained together to form a cascade. The overall computing is an accumulated sum of the entire chain. The compiler spreads the computation of the cascaded kernels across multiple cores. The cores perform a cycle by cycle accumulation in a register in the cores, that is, using internal registers in the cores and not using the memory modules. As such, the cores can use register-to-register communication to execute the chain without using the memory modules as buffers (e.g., the single and double buffers described above). In one embodiment, rather than the programmer chaining multiple kernels to form a cascade, the compiler (or some other software application) could perform this transformation where the kernel is split between cores to form the cascade.

Constraints

Figure 13:
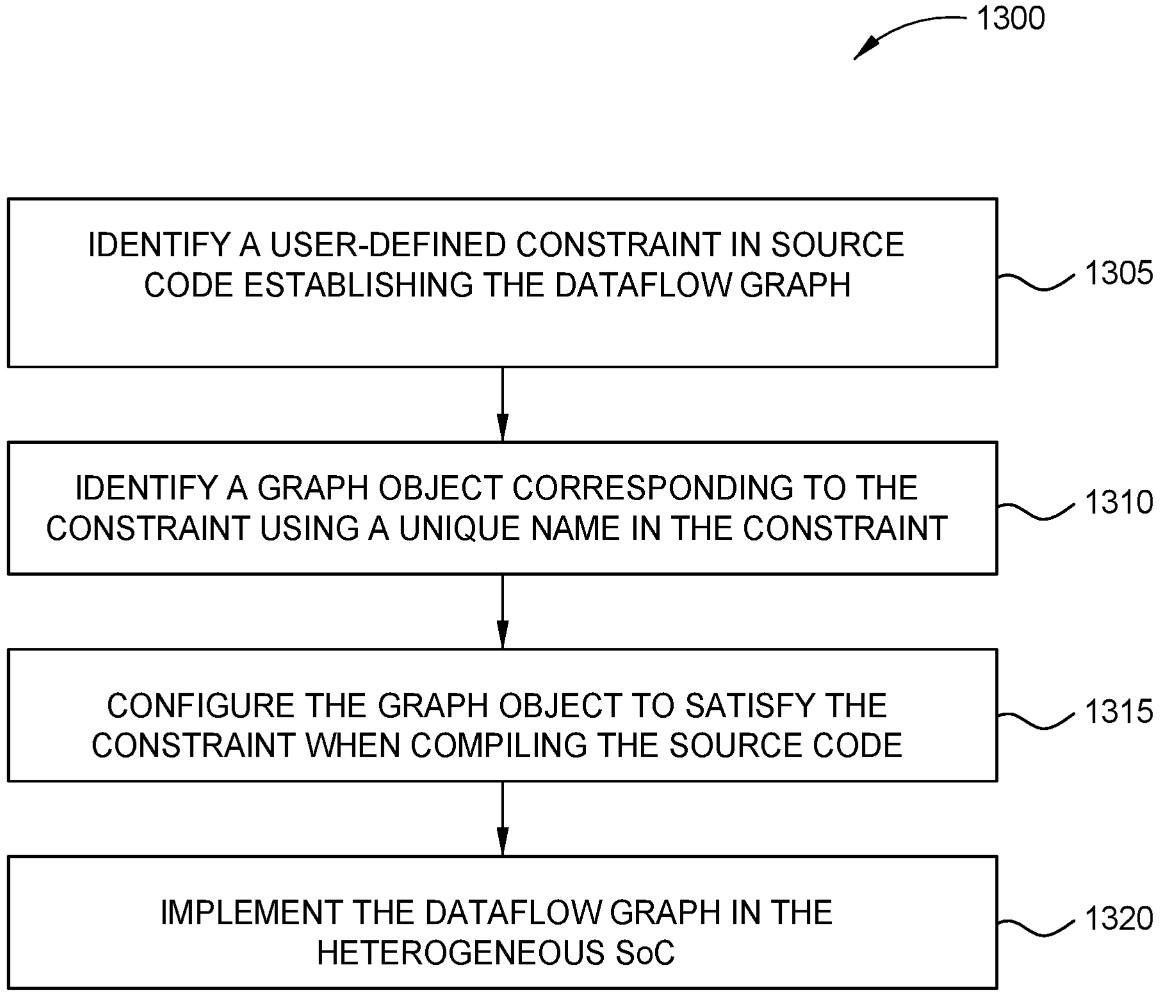
FIG. 13 is a flowchart for compiling source code to implement a dataflow graph using constraints, according to an example.

FIG. 13 is a flowchart of a method 1300 for compiling source code to implement a dataflow graph using constraints, according to an example. At block 1305, the compiler identifies a user-defined constraint in source code establishing the dataflow graph. For example, referring to FIG. 6, the programmer can add the constraints 615 to the graph source code 420. However, in other embodiments, the programmer places constraints in the kernel source code. In still other embodiments, the programmer may define constraints in a separate file. The graph source code can reference or link to the file so that the compiler can identify the constraints when implementing the dataflow graph.

User-defined constraints are external constraints since they are generated by the programmer rather than the compiler when compiling the source code for implementation on the SoC. In one embodiment, the number of external constraints provided by the programmer may vary depending on the intelligence of the compiler. If the compiler has internal constraints that result in well-optimized implementations of the dataflow graph, the programmer may choose to provide few constraints. Thus, the capabilities of the compiler can affect the number of external constraints the programmer decides to use. As newer more intelligent versions of the compiler become available, the programmer may provide fewer constraints.

The types of constraints can vary. Moreover, the number of constraints that a programmer provides may be correlated to how much the programmer understands the underlying hardware in the SoC. If the programmer knows little about the hardware of the SoC, the constraints may dictate an overall performance of the dataflow graph (e.g., a desired performance of the dataflow graph such as cycle time or latency of the graph). If the programmer understands some basics hardware constructs in the SoC (e.g., DPEs, PL, types of communication links, and the like), the programmer may also provide constraints for these specific graph objects. Thus, some constraints can be hardware agnostic (such as performance constraints which affect the graph as a whole) while other constraints are hardware aware and affect particular graph objects (or groups of graph objects) in the dataflow graph.

As an example of a hardware aware constraint, the programmer may stipulate where in the DPE array a particular kernel should be located (e.g., a kernel location constraint). Or the programmer can stipulate a location relationship between two kernels (e.g., the two kernels should be hosted on the same core or hosted on neighboring cores). In another example, a constraint can stipulate where a particular buffer for a communication link (or a port for a kernel) should be placed in the DPE array. The location requirement of the buffer could be absolute address or a memory bank, or a relative location with respect to another buffer or kernel or the stack associated with the processor where the kernel executes. Another type of constraint can indicate whether a particular buffer should be disposed in a memory module that neighbors a core hosting a particular kernel. Another type of constraint could apply to the dataflow graph as a whole. Using these types of constraints, the programmer can control how the compiler places the graph objects (e.g., kernels, ports, communication links, etc.) in the SoC.

The programmer can also provide performance constraints which can be hardware agnostic. For example, the programmer may want the latency of the graph to be less than a certain number of processing cycles. The compiler can test its implementation of the graph to determine whether it satisfies the performance constraint, and if not, reconfigure the graph until the constraint is satisfied. For example, the compiler may split two kernels into two different cores if they were previously co-located on the same core, or move a buffer to a shared memory module so the kernel can access the data directly without having to use the interconnect in the DPE array.

In another embodiment, the constraint may define a utilization of a core/port/FIFO/memory module or a preferred FIFO depth. The compiler can test its implementation of the graph to determine whether it satisfies the performance constraint, and if not, reconfigure the graph. Because with performance constraints the compiler often tests the graph to determine whether the constraint is satisfied, these constraints can also be referred to as derived constraints.

At block 1310 the compiler identifies a graph object corresponding to the constraint using a unique name in the constraint. In this example, each of the graph objects can be assigned a unique name—e.g., each kernel, communication link, port, etc. When formatting the constraints, the programmer can use the unique names to inform the compiler to which graph object the constraint applies.

In one embodiment, the programmer can provide unique names to each graph object in an index. The index can then be accessible to the compiler. In another embodiment, the compiler assigns the unique names to the graph objects. For example, the compiler can form a hierarchical tree of all the graph objects in the graph and assign unique names to the objects by traversing the tree from the root to the leaves. The hierarchical tree is also accessible to the programmer so she can assign constraints to particular object using the unique names.

At block 1315, the compiler configures the graph object to satisfy the constraint when compiling the source code. Various examples of placing graph objects according to the constraints are illustrated in FIG. 14.

Figure 14:
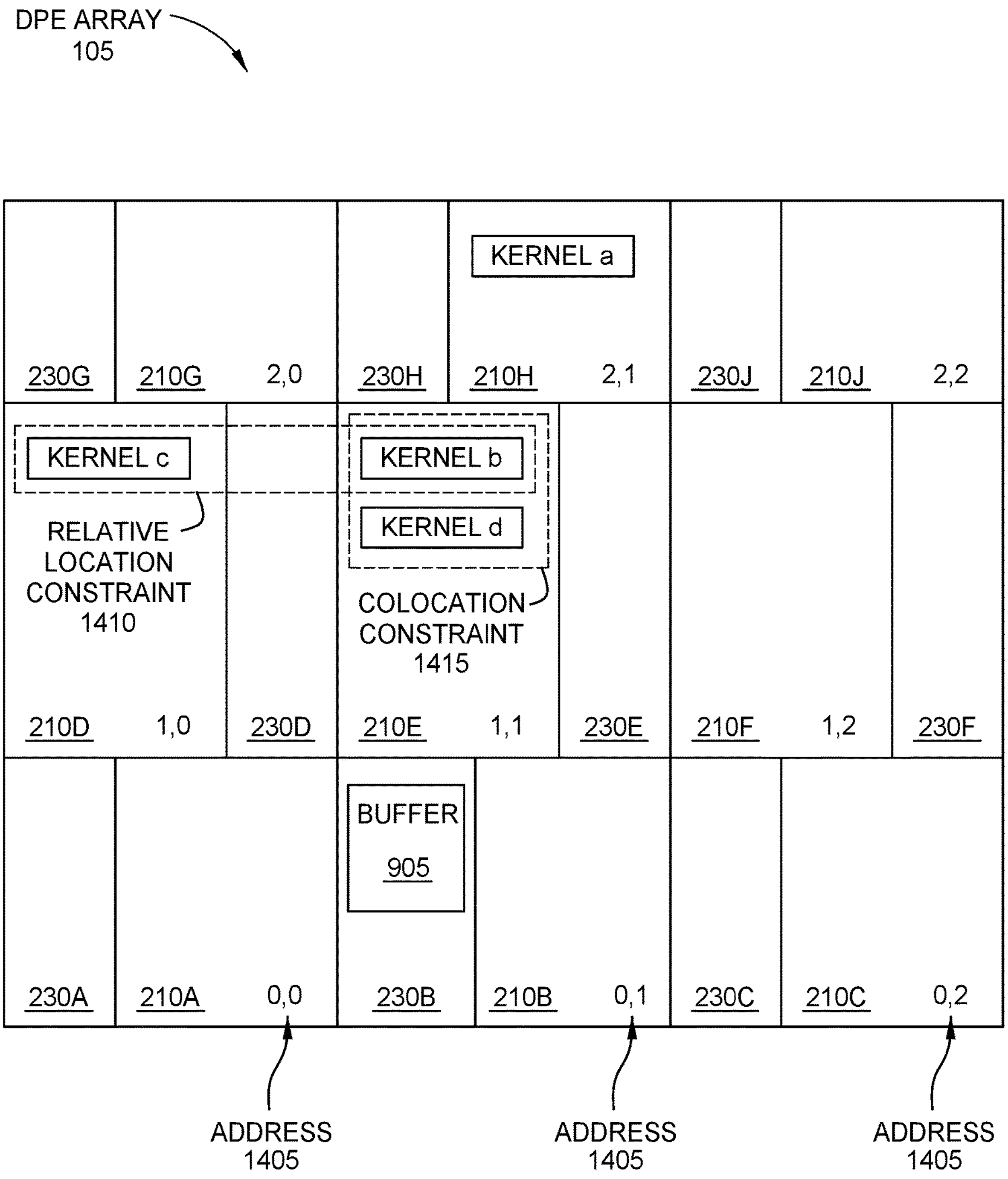
FIG. 14 is a DPE array with graph objects implemented using user-defined constraints, according to an example.

FIG. 14 is a DPE array 105 with graph objects implemented using user-defined constraints, according to an example. In this example, the graph objects include kernels a-d and a buffer 905. In one embodiment, the compiler places the kernel a on the core 210H in response to a location constraint provided by the programmer. For example, the programmer can use unique addresses 1405 assigned to the cores 210 to instruct the compiler to place the kernel a on the core 210H. That is, the constraint may include the address 1405 of the core 210H (i.e., 2,1) which instructs the compiler to place the kernel a on the core 210H.

FIG. 14 also illustrates a colocation constraint 1415 which indicates that the kernels b and d should be collocated on the same core 210E. While the programmer could format the constraint in source code to require the compiler to place both kernels b and d on the core 210E (e.g., using its address 1,1), in another embodiment the constraint may not stipulate a particular core which gives the compiler freedom to identify on its own the best core 210 to host the kernels b and d.

FIG. 14 also illustrates a relative location constraint 1410 which instructs the compiler to place the kernel c and kernel b in neighboring cores—i.e., core 210D and 210E. Again, while the programmer could format the constraint to indicate which two of the cores 210 in the DPE array 105 should host the kernels c and b, in another embodiment the compiler has the freedom to choose the cores 210 to use based on other metrics such as availability.

Moreover, FIG. 14 illustrates placing the buffer 905 according to a constraint provided by the programmer. In one embodiment, the programmer stipulates in a constraint that the buffer 905 should be placed in the memory module 230B using, for example, the address of the tile (0,1). Alternatively, the constraint may not provide an absolute location of the memory module in the array 105 but instead stipulate that the buffer 905 be disposed in a memory module 230 that can be directly accessed by the core corresponding to kernel d. Doing so gives the compiler the freedom to choose one of the four memory modules 230 surrounding the core 210E to implement the buffer using a metric such as availability. In another embodiment, a plurality of buffers may be mapped to the same memory group by a constraint (e.g., stack/reserved memory of set of kernels is mapped to same memory group).

FIG. 14 only illustrates a few location constraints that can be used to place graph objects in the DPE array 105. As mentioned above, the programmer can provide other external constraints (or the compiler can identify other derived constraints) not illustrated in FIG. 14 that can be used to customize the graph according to a programmers' preferences. Further constraint types can include routing resources a path should take to transport data from one point to another point, whether a data path should be circuit switched or packet switched, and how much delay should be inserted on the data path. Some constraints may aid the compiler to make better decisions when generating the compiled code. Other constraints can improve performance of the SoC such as buffer-to-buffer placement constraints to avoid memory conflicts.

Returning to the method 1300, at block 1320 the compiler implements the dataflow graph in the heterogeneous processing system of the SoC according to the constraint. As mentioned above, the compiler can generate a bitstream and binary code which configures the heterogeneous processing system in the SoC to execute the dataflow graph.

In one embodiment, the dataflow graph can extend across multiple SoCs (e.g., multiple FPGAs). In that case, the graph source code may include a first constraint used to configure a first graph object in a heterogeneous processing system of a first SoC and a second constraint used to configure the a second graph object in a heterogeneous processing system of a second SoC.

Figure 15:
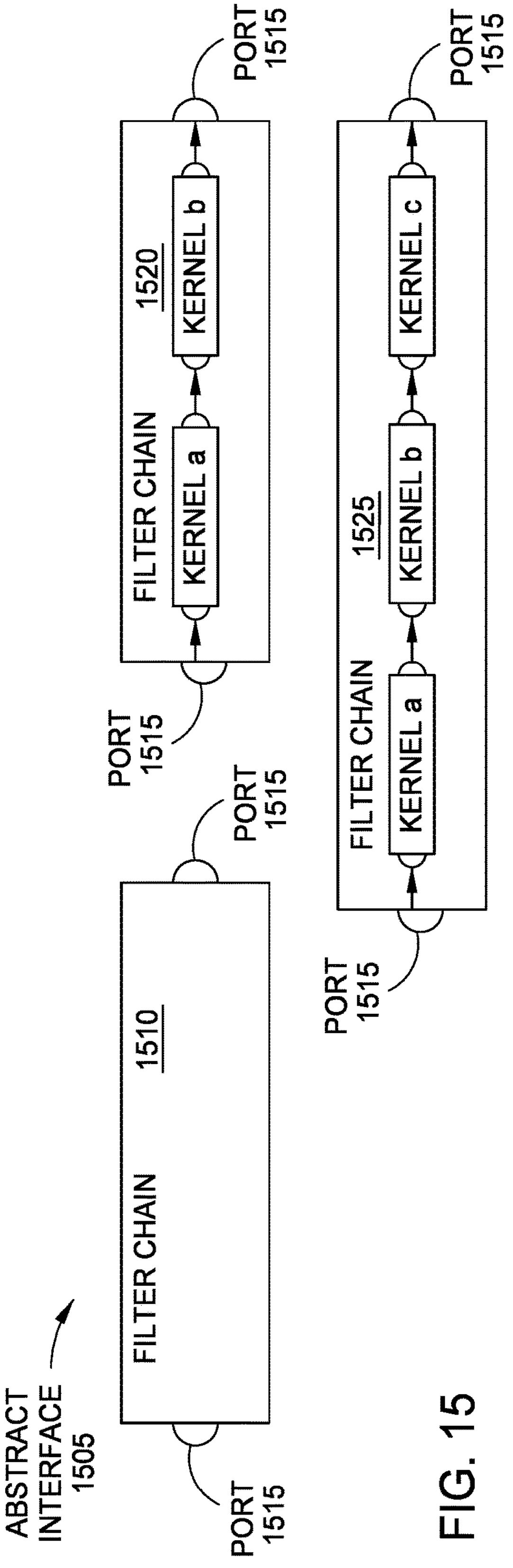
FIG. 15 is an inheritable abstract interface 1505, according to an example.

FIG. 15 is an inheritable abstract interface 1505, according to an example. The abstract interface 1505 defines an interface for, in this example, a filter chain 1510 that includes ports 1515. The interface 1505 may be defined by a software class that can be implemented by the programmer in different ways. For example, the filter chain 1520 inherits the abstract interface 1505 and includes kernels a and b. The filter chain 1525, in contrast, also inherits the abstract interface 1505 but includes kernels a, b, and c. For example, the filter chain 1525 may require more granular processing than the filter chain 1520. Because the abstract interface 1505 can be defined using an object orientated programming language, the interface 1505 can be inherited and used for different implementations.

Figure 16:
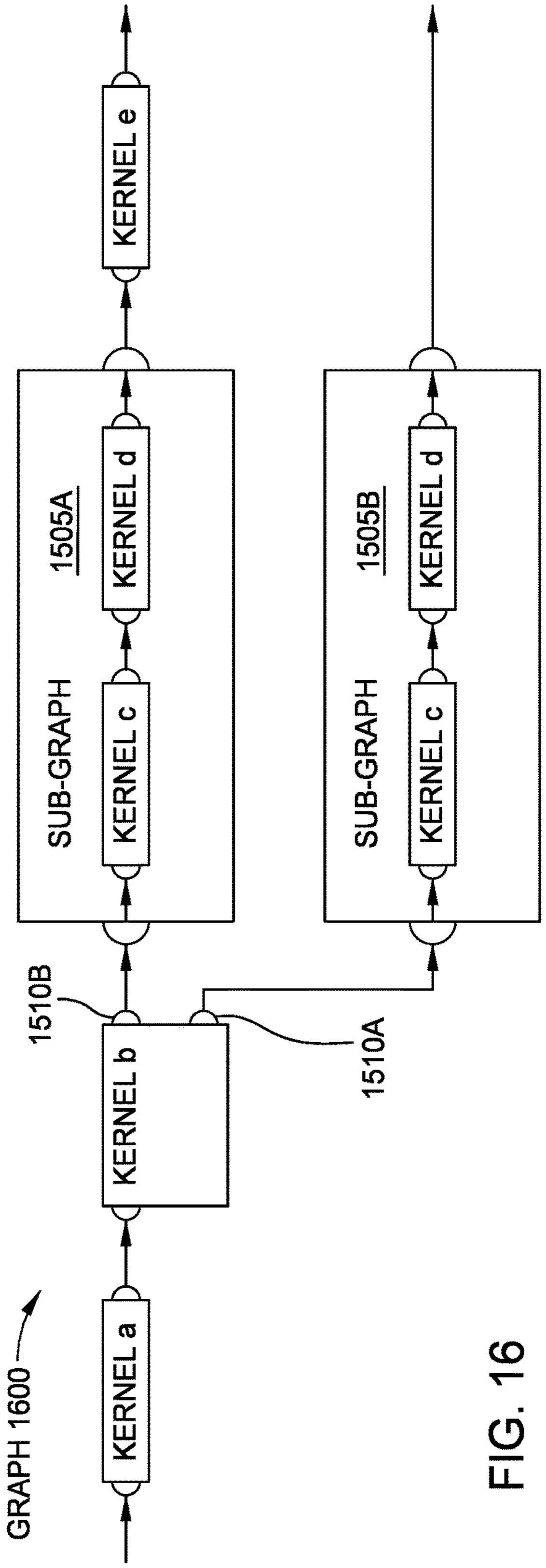
FIG. 16 is a dataflow graph with multiple sub-graphs, according to an example.

FIG. 16 is a dataflow graph 1600 with multiple sub-graphs 1505, according to an example. FIG. 16 differs from FIG. 15 in that the source code for the dataflow graph 1600 includes two instances of the sub-graph—i.e., sub-graph 1505A and 1505B. That is, the sub-graph 1505 can be defined once and the multiple instantiations of that sub-graph 1505 can be inserted into the graph 1600. For example, the receiver chain defined by the graph 1600 may use two of the filters defined by the sub-graphs 1505 because it corresponds to a two channel system rather than the one channel system of FIG. 15. In this manner, a sub-graph 1505 can be separately defined from the graph source code (e.g., in its own file) and then instantiated any number of times.

In FIG. 16, the kernel b is modified to include a first port 1510B to transmit data windows to the sub-graph 1505A and a second port 1510A to transmit data windows to the sub-graph 1505B. This can be defined by the programmer in the source code.

Figure 17:
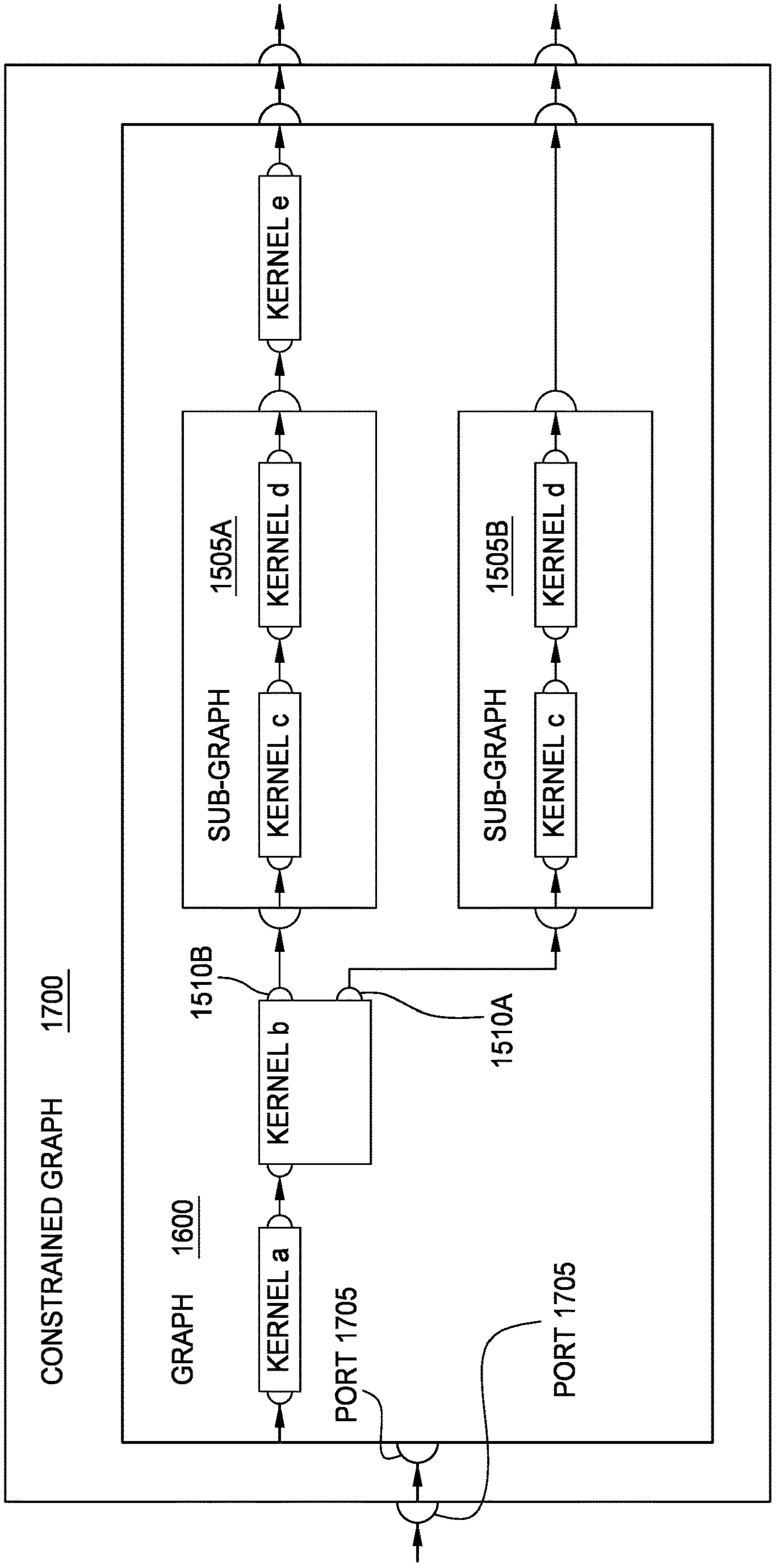
FIG. 17 is a constrained dataflow graph, according to an example.

FIG. 17 is a constrained dataflow graph 1700, according to an example. FIG. 17 includes the graph 1600 illustrated in FIG. 16 which include multiple instantiations of the sub-graphs 1505. However, the graph 1600 is contained within the constrained dataflow graph 1700. In one embodiment, the constrained graph 1700 is a wrapper graph that adds constraints to logic design. That is, by encapsulating the graph 1600 in the constrained graph 1700 (which is accessible using the ports 1705), the programmer can add overall constraints to the execution of the graph 1600. Moreover, the compiler automatically propagates the constraints from constrained graph 1700 that can transform the graph 1600 into a different implementation which can then be instantiated into another dataflow graph.

Figure 18:
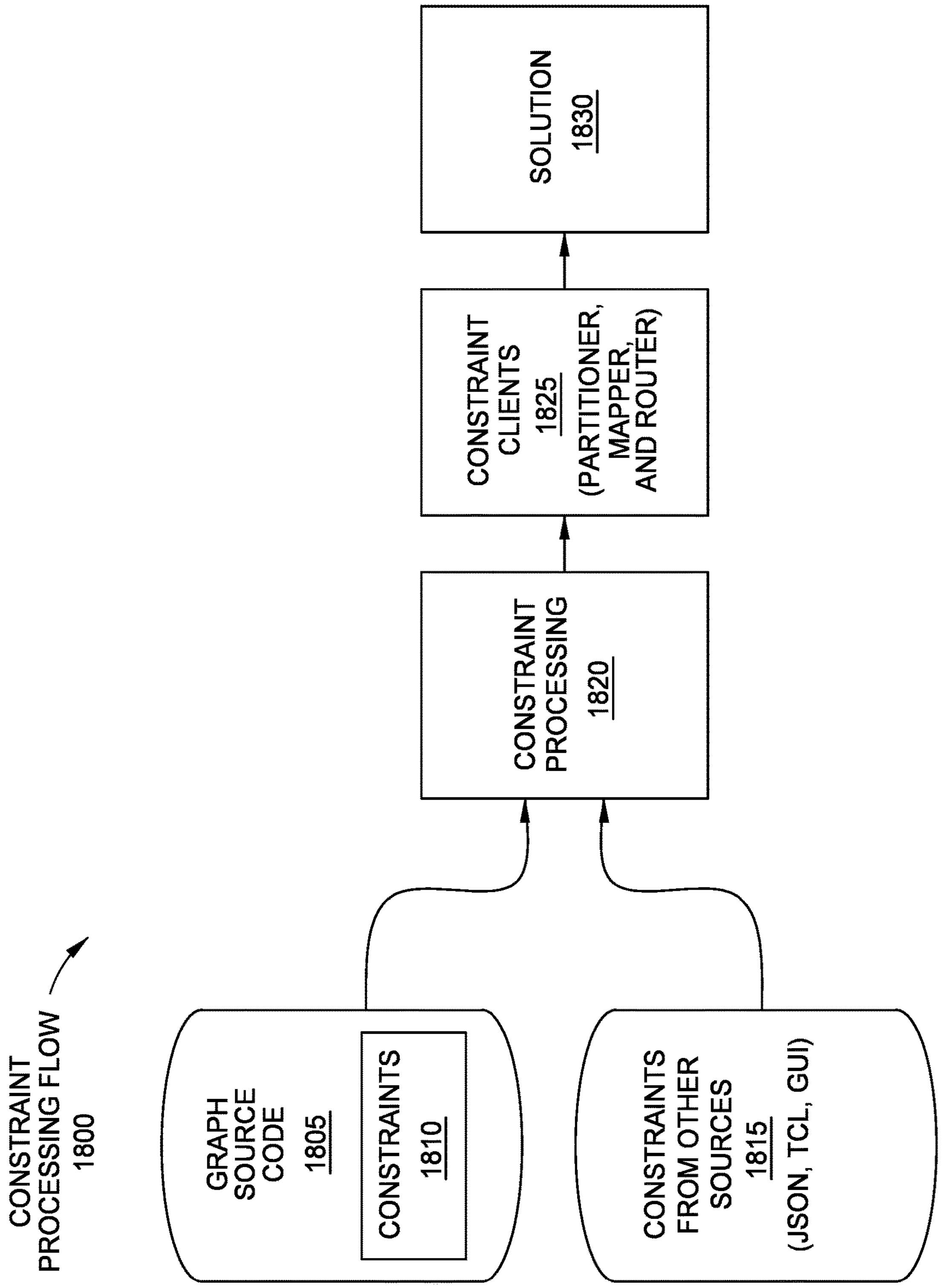
FIG. 18 is a constraint processing flow for merging constraints from multiple sources, according to an example.

FIG. 18 is a constraint processing flow 1800 for merging constraints from multiple sources, according to an example. The flow 1800 includes graph source code 1805 which includes constraints 1810 which can include any of the constraint types discussed above. Moreover, the flow 1800 includes constraints from other sources 1815 which again can include any of the constraint types discussed above. These latter constraints can be defined in a javascript object notation (JSON) file format, a TCL file format, or by using a graphical user interface (GUI). As such, the constraints from the other source 1815 are not embedded within the source code 1805 but are separate files.

During constraint processing 1820, the compiler merges the constraints 1810 in the source code 1805 with the constraints from the other sources 1815. In one embodiment, the constraints (regardless where they are defined) have a format so they can be merged with the internal data structure of the compiler. In one embodiment, a programmer can specify the constraints for each sub-graph separately and the compiler can handle reading and merging these constraints with the parent graph program defined by the source code 1805.

Constraint clients 1825 such as a partitioner, mapper, and router receive the merged constraints and ensure the solution 1830 satisfies the constraints. That is, the constraint clients 1825 ensure that the implementation of the dataflow graph in the SoC satisfies the constraints 1810 embedded in the source code 1805 as well as the constraints from the other sources 1815.

Control APIs

Figure 19:
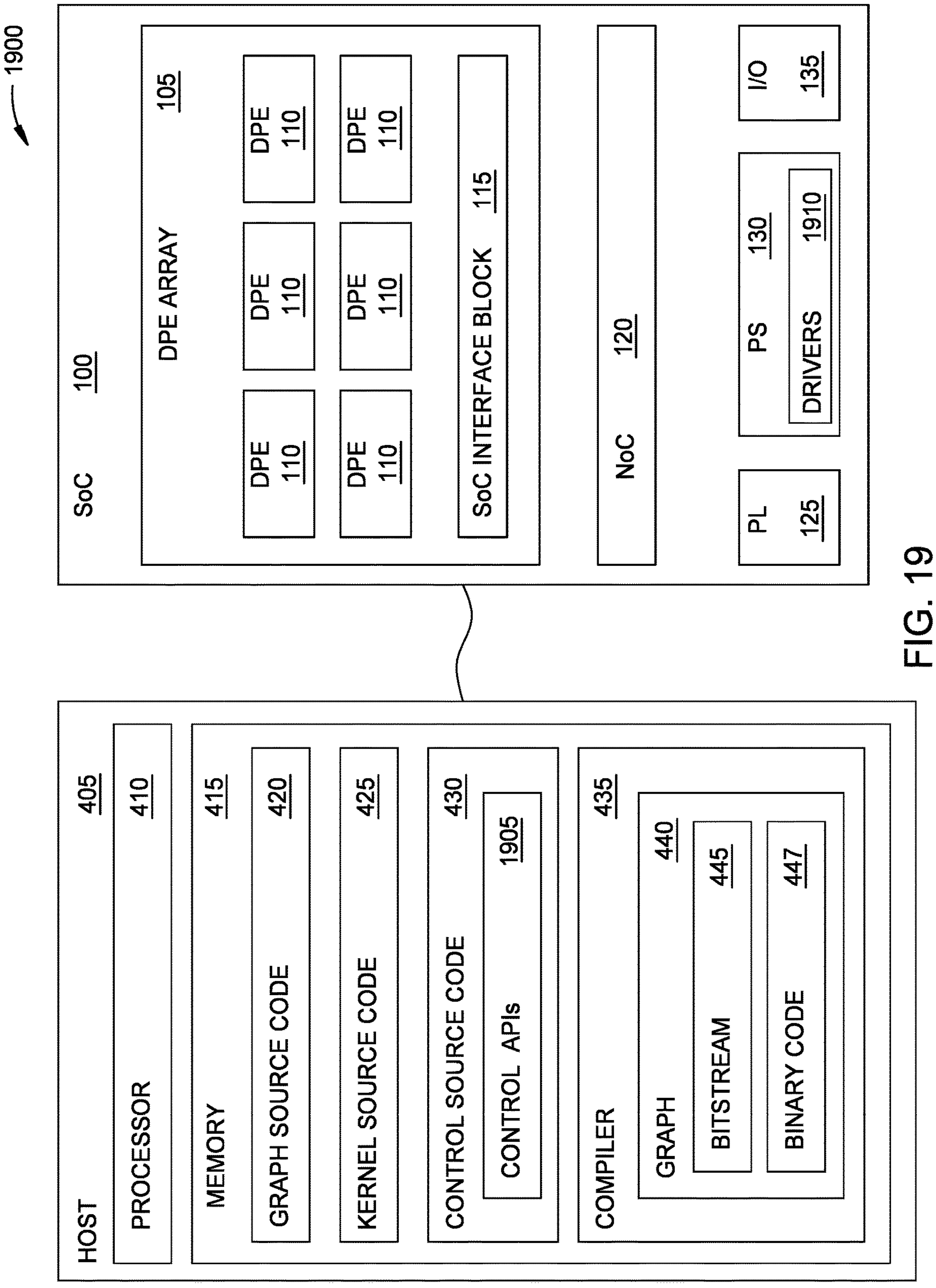
FIG. 19 is a block diagram of a computing system for implementing a dataflow graph on the SoC, according to an example.

FIG. 19 is a block diagram of a computing system 1900 for implementing a dataflow graph on the SoC, according to an example. The computing system 1900 includes many of the same components discussed above in FIG. 4 which are not discussed in detail here. However, FIG. 19 differs from FIG. 4 in that the computing system 1900 includes control APIs 1905 which may or may not be in the computing system illustrated in FIG. 4. As shown, the control APIs 1905 are disposed in the control source code 430.

In general, the programmer can use the control APIs 1905 to change parameters that control the execution of the dataflow graph 440 on the SoC 100. That is, embodiments herein use the APIs 1905 and corresponding methods to control, interact, and at least partially reconfigure a user application (e.g., the dataflow graph 440) executing on the heterogeneous processing system of the SoC 100 through a local control program compiled from the control source code 430, or by executing the control source code on the PS itself). Using the control APIs 1905, users can manipulate such remotely executing graphs directly as local objects and perform control operations on them, (e.g., for loading and initializing the graphs; dynamically adjusting parameters for adaptive control; monitoring application parameters, system states and events; scheduling operations to read and write data across the distributed memory boundary of the platform; controlling the execution life-cycle of a subsystem; and partially reconfiguring the computing resources for a new subsystem).

For example, the kernels or other graph objects in the SoC 100 may have parameters, such as a gain or filter coefficients that control the operation of these objects. These parameters can be dynamically controlled using the control program that executes on the host or the SoC itself. The compiler 435 can configure the control program to change the parameters, which means the programmer can express the APIs 1905 at a high-level (using source code) while the compiler 435 handles the hardware details for adjusting the parameters such as configuring registers, identifying routes, identifying the location of the graph objects, and the like.

Advantageously, the compiler 435 can configure drivers 1910, registers, and other hardware in the SoC 100 so that the APIs 1905 can perform the desired function. For example, the drivers 1910 may be used to perform a DMA to read data in DDR memory in the SoC 100 into one of the DPEs 110 executing a kernel in the dataflow graph 440. While the drivers 1910 are illustrated as part of the PS 130, in other in other embodiments, the drivers 1910 could be implemented using controllers in the PL 125 or through control signals transmitted to the SoC 100 from a remote controller using a network.

Without the control APIs 1905, the programmer would have to configure the driver 1910 directly which may require the programmer to know the location of the kernel (e.g., the host DPE) as well as the route to reach the kernel. Instead, the compiler 435 can configure the drivers 1910 in response to detecting the corresponding API 1905 in the control source code 430. That is, when defining the API 1905, the programmer simply identifies the graph object (e.g., a particular kernel or kernel port) and the compiler 435 can do the rest—e.g., configure the drivers 1910 and program registers to perform the DMA.

FIGS. 20A and 20B illustrate control APIs for controlling the execution of a dataflow graph on the SoC, according to examples. FIG. 20A illustrates a list of control APIs 1905 that can be used to control the operation of a dataflow graph. FIG. 20A includes comments next to each API 1905 explaining its purpose. For example, the graph( ) API defines an empty dataflow graph class constructor. All user defined graphs are extensions of this class.

The init( ) API initializes a dataflow graph, the run( ) APIs execute the graph, the wait( ) APIs wait for the graph to complete the previous run or to wait for a number of cycles and the pause the graph, the resume( ) API resumes the graph after a pause, and the end( ) APIs wait for the last run to complete and then disables the DPE. Thus, using these APIs 1905, the programmer can control when the graph begins operating, how long it operates, and end the graph.

The update( ) APIs permit the programmer to update runtime parameters in the dataflow graph by specifying a graph object (e.g., by using the input_port& p pointer). Using the provided information, the compiler can configure the hardware in the SoC to perform the update using a trigger which is discussed below.

Using the read( )APIs, the programmer can read runtime parameters from the executing dataflow graph. This is especially useful for controlling graph execution based on dynamic data-dependent decisions.

FIG. 20B illustrates other control APIs 1905 that may be part of the programming model. FIG. 20B includes a global memory input/output (GMIO) class with special APIs for moving data between the DPE array and DDR memory in the SoC. For example, the init( ) API initializes a GMIO object by providing a set of memory addresses that exist in the DDR memory. The gm2me_nb( )APIs can use the DMA registers in the shim to transfer data from the global memory to the DPE array. In one embodiment, the compiler configures the registers in the shim to perform the APIs 1905 within the GMIO class. Further, these APIs 1905 are non-blocking commands which means the PS (which may host the control program) can perform other functions concurrently with the GMIO reads and writes. In one embodiment, the GMIO APIs permit the SoC to use the same set of DDR memory to transfer data into the DPE array and read data out from the array. That is, the programmer can use the GMIO APIs to read data from the DDR memory into the DPE array which then processes the data and stores the processed data in the same DDR memory.

FIG. 20B also includes a programmable logic input/output (PLIO) class with an API for moving data between the PL and the DPE array. The PLIO API is more straightforward than the GMIO APIs since it may only be used for simulation environments where data is transferred between the DPE array and input/output files.

FIG. 20B also has an event class with APIs for monitoring performance or executing an event trace for a particular graph object (e.g., a particular kernel of GMIO port). The event APIs permit the programmer to track specific hardware events, count occurrences of hardware events and measure aggregate performance metrics. In one example, the programmer can measure latency of a graph by the tracking the input and output of the dataflow graph. For example, in response to the APIs, the compiler can establish a performance counter that counts the number of processing cycles between when the first data is inputted into the dataflow graph and when the first data is outputted by the dataflow graph. In another example, the programmer can measure the throughput of a graph executing within the DPE. The compiler can establish performance counters to count the number of cycles and the number of data items produced during some number of iterations of graph execution.

Figure 21:
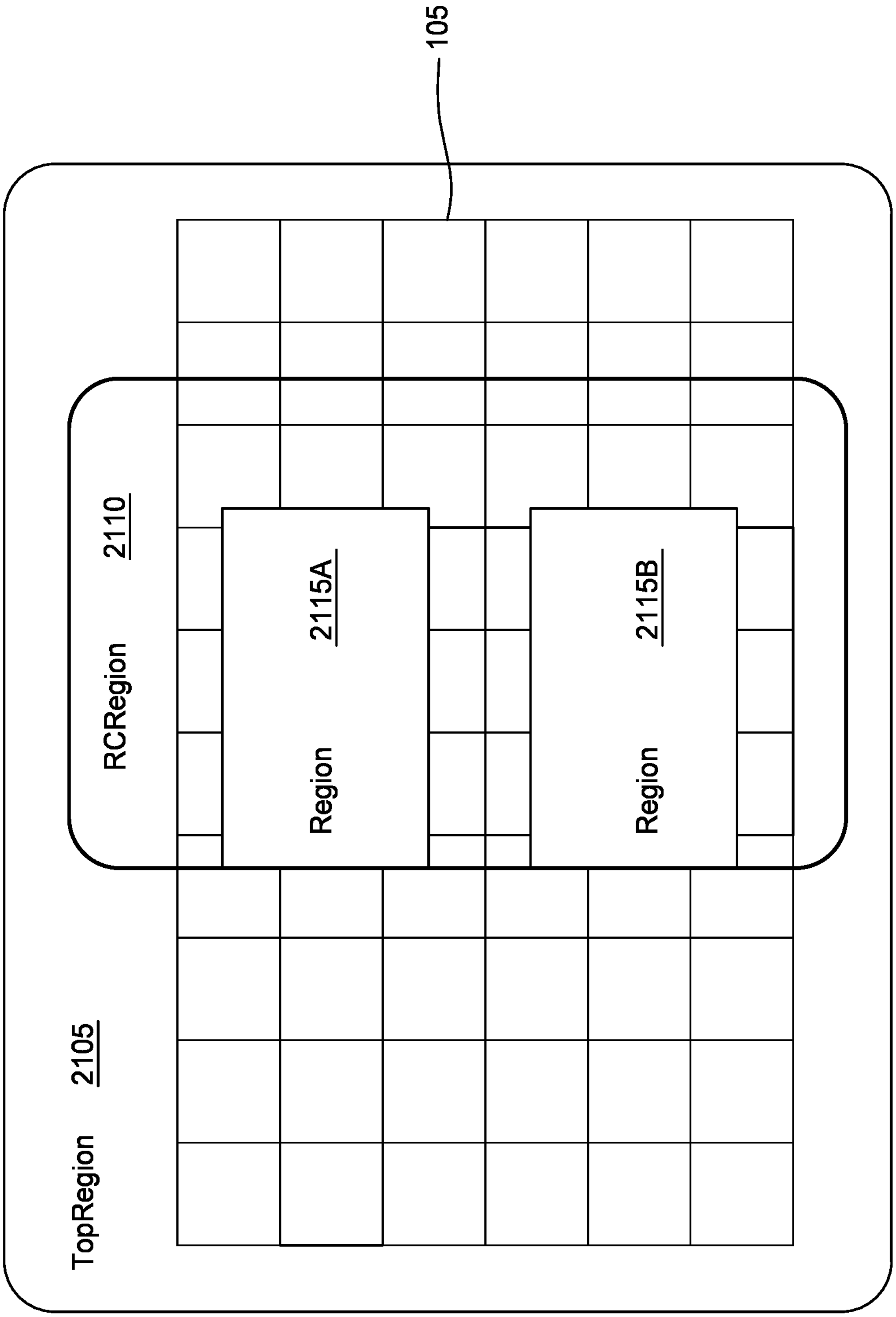
FIG. 21 illustrates logically dividing a data processing engine array into different regions, according to an example.

FIG. 21 illustrates logically dividing a DPE array 105 into different regions, according to an example. In this embodiment, a TopRegion 2105 includes the entire DPE array 105 and its DPEs 110. The RCregion 2110 includes a subset of the columns in the DPE array 105. The regions 2115A and 21158 define sub-regions within the RCregion 2110. In this manner, the DPE array 105 can be divided into a hierarchy of regions. In this example, the RCregion 2110 is a sub-region of the TopRegion 2105 while the regions 2115A and 21158 are sub-regions contained within the RCregion 2110.

Using the APIs and constraints discussed above, the programmer can assign different dataflow graphs to different regions in the array 105. For example, a plurality of dataflow graphs may process digital data obtained from a radio transceiver which can, depending on the time of day, receive data using different numbers of antennas. To disable or enable dataflow graphs corresponding to the antennas, the programmer can use the placement constraints to place each dataflow graph in a separate RCregion 2110 so that the process control corresponding to a particular antenna can be selectively enabled and disabled. Thus, placing different dataflow graphs in different regions gives the programmer control so that one dataflow graph can be enabled or disabled without affecting the dataflow graphs operating in different regions. In one embodiment, the programmer provides a plurality of logically independent container graphs derived from the class RCGraph and assigns a plurality of dataflow graphs to them. The compiler then determines the specific hardware regions for each container graph so each dataflow graph can be controlled independently.

In another embodiment, the programmer can use the control APIs discussed above to establish a plurality of alternative graphs within a single container graph. Alternative graphs are dataflow graphs that share the same logical container graph, and thus, share the same hardware region. If the number of alternative graphs for a container graphs is greater than one, this means different dataflow graphs share the same hardware region but execute at different times. In one embodiment, the container graph and the assignment of the alternative dataflow graphs to a particular region is defined in a package binary that is provided to the SoC by the compiler.

Figure 22A:
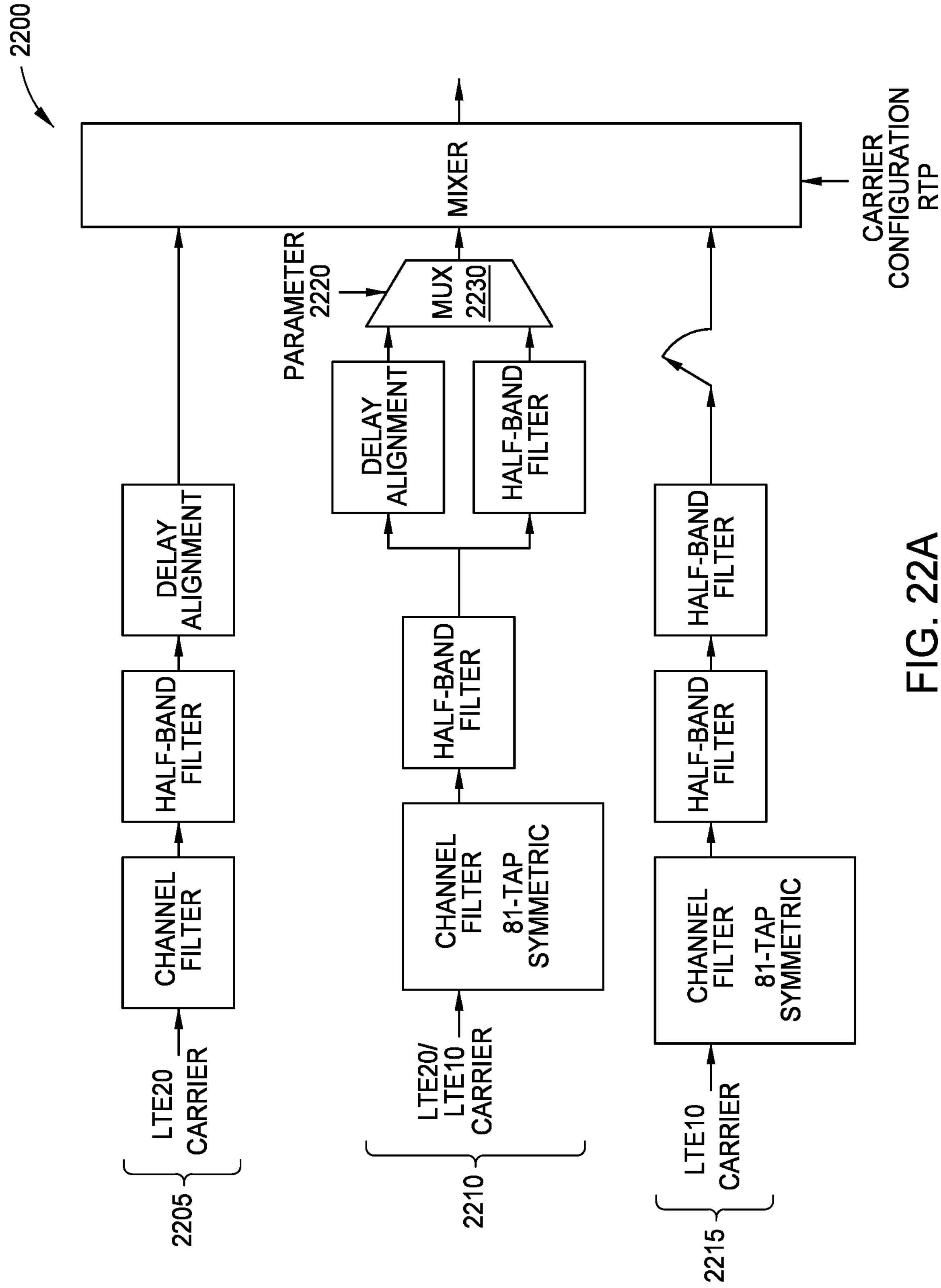
FIGS. 22A and 22B illustrate dynamically changing the execution of the dataflow graph, according to an example.

FIG. 22A illustrates dynamically changing the execution of the dataflow graph, according to an example. That is, FIG. 22A illustrates using one or more control APIs to dynamically reconfigure a dataflow graph 2200 (e.g., change a run-time parameter) to alter how the graph 2200 processes data. This reconfiguration can occur without changing the underlying hardware. That is, after the SoC is initialized, the dataflow graph 2200 can switch between different states on the fly without requiring the hardware to be reconfigured.

The dataflow graph 2200 illustrates a processing scheme that includes a dedicated LTE20 channel 2205, a dedicated LTE10 channel 2215 and a reconfigurable channel 2210 which can be selectively changed between a LTE20 and a LTE10 channel using run-time parameters 2220. For example, to configure the channel 2210 as a LTE20 channel, the parameter 2220 controls a mux 2230 such that it outputs the data received from a half-band filter. The control APIs can alter the parameters 2220 such that the mux 2230 ignores the data outputted by the half-band filter and the delay alignment block so that the channel 2210 processes data similar as the LTE10 channel 2215.

Figure 22B:
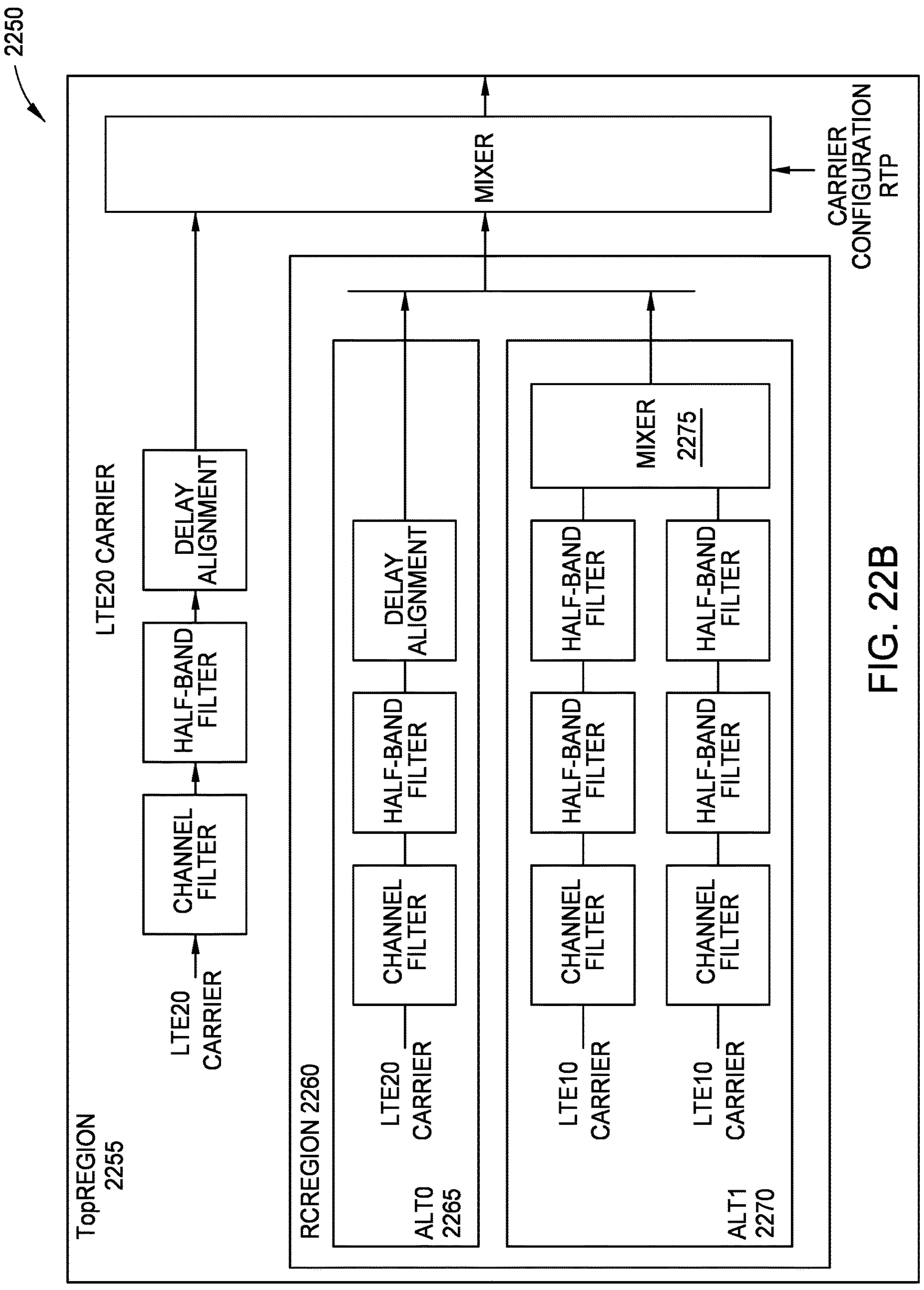

In one embodiment, a plurality of reconfigurable alternatives within the dataflow graph 2200 can be assigned to the same region in the SoC. This is illustrated in FIG. 22B. For example, the graph 2250 may be assigned to the TopRegion 2255 in the SoC. Alternatively, the different channels in the graph 2200 may be assigned to different regions. In this example, rather than having a reconfigurable channel 2210 that includes the mux 2230, the graph 2250 is built with two alternatives for a reconfigurable container RCRegion 2260. One alternative Alt0 2265 is the LTE20 channel and the other alternative Alt1 2270 carries two LTE10 channels along with a mixer 2275. The fixed LTE20 channel in Alt0 2265 can be assigned to its own region in the SoC, separate from the region or regions to which the two LTE10 channels are assigned, or it could be made part of the TopRegion 2255. Thus, when the RCRegion 2260 should function as an LTE20 channel, the control APIs can reconfigure the region to load the graph Alt0 2265 (without affecting the dedicated LTE20 channel disposed in other regions). However, when the RCRegion 2260 should function as two LTE10 channels, the control APIs can reconfigure the region to load the alternative graph Alt1 2270. While doing so avoids the circuitry illustrated in FIG. 22A used to dynamically reconfigure the channel 2210 such as the mux 2230 and reuses the same DPE resources for the two alternatives (which can reduce the amount of space the graph 2200 uses in the SoC), it typically takes more time to reconfigure the hardware in the region between the LTE20 and LTE10 embodiments than to control the parameters 2220 for the muxes 2230.

Figure 23A:
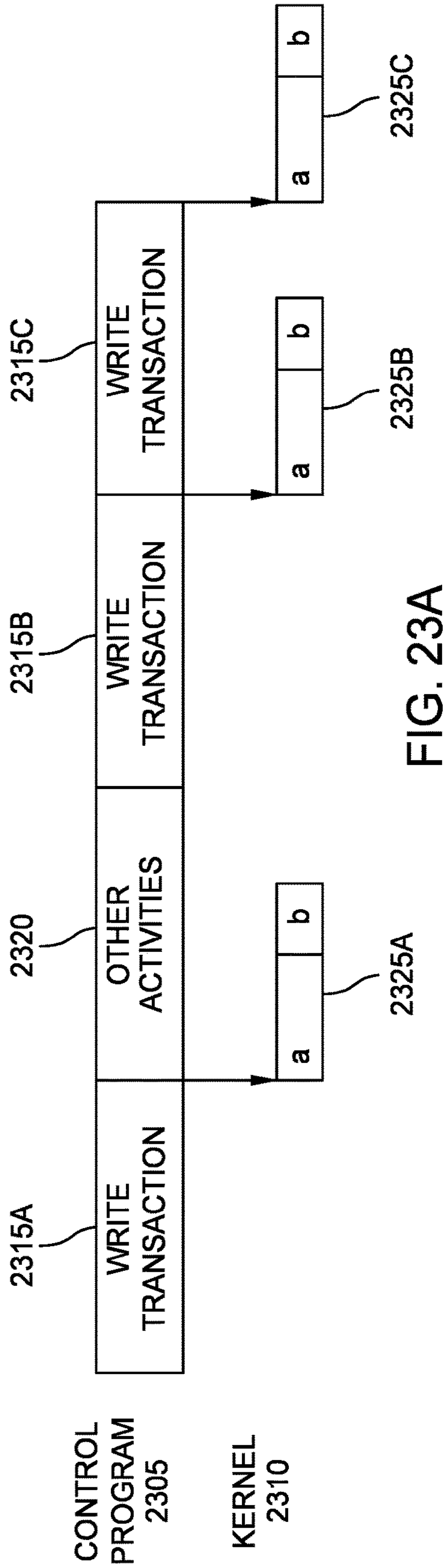
FIGS. 23A and 23B illustrate triggered and asynchronous parameters, according to examples.
Figure 23B:
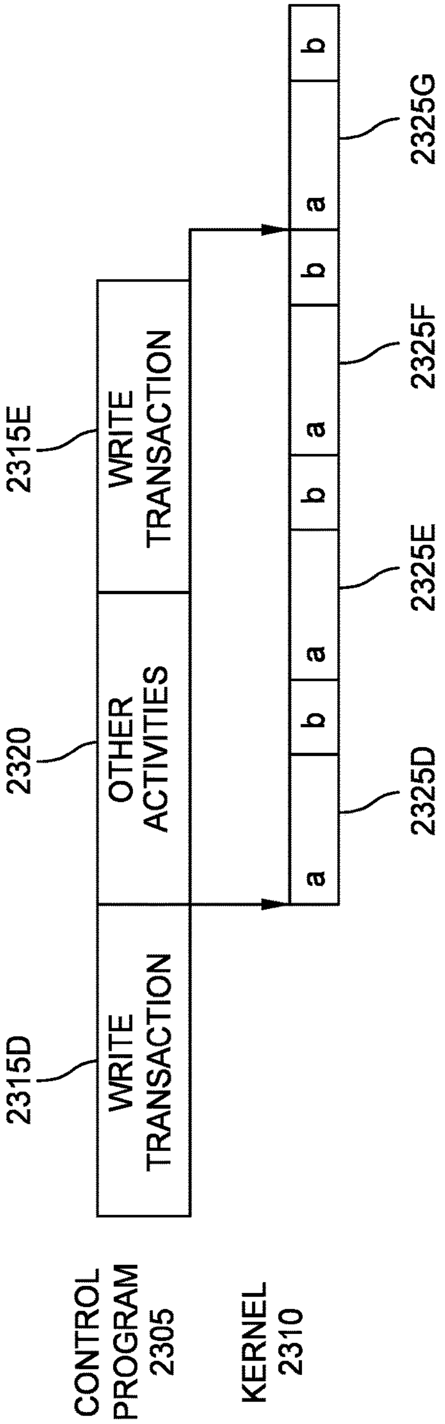

FIGS. 23A and 23B illustrate triggered and asynchronous parameters, according to examples. For example, unlike windows and streams which correspond to streaming data, parameters can be used to control the execution of the dataflow graph using non-streaming data. In one embodiment, the programmer uses a synchronization trigger at the start of a kernel execution to change the parameters in the dataflow graph. In another embodiment, the change in the parameter can take place asynchronously with the execution of a kernel. In one embodiment, the control program (whether executing on the PS or the host) initiates the triggered or asynchronous change in parameters. In another embodiment, the programmable logic initiates the triggered or asynchronous change in parameters. Examples of parameters that can be altered using triggers include parameters in a function or method call or changing the size of the windows.

FIG. 23A illustrates triggered parameters where a kernel waits on a new parameter every time the corresponding function is invoked. As a result, the kernel does not execute until the control program 2305 provides the triggered parameter. For example, the control program 2305 generates a write transaction 2315A to the ping buffer of a parameter which is received by the DPE executing a kernel 2310. In response, the kernel 2310 processes data during an execution block 2325A. Concurrently, the control program 2305 is free to perform other activities during the time block 2320. That is, the control program 2305 can transmit the triggered parameter value to the ping buffer (which is non-blocking) and then can perform other tasks during time block 2320.

Notably, when the kernel 2310 finishes the execution block 2325A, it does not begin to immediately process more data even if that data is available at its inputs. Instead, the kernel 2310 waits until receiving the second write transaction 2315B at the pong buffer which includes the triggered parameters (which can have the same values as in the write transaction 2315A or different values) to perform the execution block 2325B. Once finished with execution block 2325B, the kernel 2310 again waits until receiving the triggered parameters in the write transaction 2315C to begin the execution block 2325C. In this manner, triggered parameters permit the control program 2305 to transmit updated parameters to the kernel 2310 before each execution block.

FIG. 23B illustrates asynchronous parameters where the kernel 2310 executes using the previously received parameters. As shown, the control program 2305 transmits the write transaction 2315D to the ping buffer which includes updated parameters for the kernel 2310 to use when processing data during execution block 2325D. Concurrently, the control program 2305 can perform other activities during the time block 2320 like in FIG. 23A. However, unlike in FIG. 23A, once the execution block 2325D is complete, the kernel 2310 can immediately begin processing data during execution block 2325E and 2325F. Because the kernel 2310 has not received new parameters from the control program 2305, the kernel 2310 processes input data during the execution blocks 2325E and 2325F using the same parameters during execution block 2325D.

During execution block 2325E, the control program 2305 transmits a new write transaction 2315E to the pong buffer which includes updated parameters for the kernel 2310. The updated parameter value is available for use by the kernel 2310 after the completion of the write transaction 2315E. Thus, when the kernel 2310 begins execution block 2325G, the kernel 2310 uses the updated parameters (which may be different from the values of the parameters used during blocks 2325D-F). In this manner, the kernel 2310 can continuously execute using the same parameters until the control program 2305 transmits updated parameters to the kernel 2310.

In one embodiment, when the kernel is invoked, the compiler creates locking criteria which ensures all the data is available before the kernel starts processing the received data and all the data is ready to be transmitted before outputting a data window. For asynchronous communication, however, the graphs does not have to make either of those checks but the user can create an API that defines the criteria used when acquiring an input window to read, or outputting a window to write. Put differently, the criteria provided by the user defines the point when the kernel synchronizes. In FIG. 6 for example, the connection from kernel e to kernel b is asynchronous. So kernel e can prepare the window and then kernel b determines (using the criteria provided by the user in the API) whether it should skip over the first few frames before synchronizing with the kernel b. That is, it is up to kernel b and e respectively to determine when it will receive or output the window using the criteria provided by the user.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A method, comprising:

providing a heterogeneous programming environment for defining a dataflow graph as object oriented source code;

receiving graph source code generated in the heterogeneous programming environment, the graph source code defining a plurality of kernels and a plurality of communication links, wherein each of the plurality of communication links couple a respective pair of the plurality of kernels to form the dataflow graph;

compiling the graph source code to implement the dataflow graph in a heterogeneous processing system using compiled source code, wherein compiling the graph source code comprises:

assigning the plurality of kernels to the heterogeneous processing system based on constraints defined in the graph source code for the plurality of kernels, wherein the constraints are user-defined constraints that instruct the compiler to place a first kernel of the kernels in a first type of hardware element in the heterogeneous processing system and place a second kernel of the kernels in a second, different type of hardware element in the heterogeneous processing system, assigning a communication type to the plurality of communication links defined in the graph source code, and selecting synchronization techniques for transferring data between the plurality of kernels using the plurality of communication links; and configuring the heterogeneous processing system to execute the dataflow graph using the compiled source code.

2. The method of claim 1, wherein assigning the plurality of kernels to the heterogeneous processing system comprises:

identifying that a first kernel and a second kernel are communicatively coupled by a first one of the plurality of communication links as defined by the graph source code;

assigning the first kernel to a first data processing engine (DPE) in the heterogeneous processing system; and assigning the second kernel to a second DPE in the heterogeneous processing system that directly neighbors the first DPE.

3. The method of claim 2, wherein the first DPE and the second DPE both have a direct connection to a shared memory module, wherein the method comprises:

assigning a double buffer in the shared memory module for transferring data between the first kernel and the second kernel.

4. The method of claim 1, wherein assigning the plurality of kernels to the heterogeneous processing system comprises:

identifying that a first kernel and a second kernel are communicatively coupled by a first one of the plurality of communication links as defined by the graph source code;

clustering the first and second kernels to a first core in an array of DPEs in the heterogeneous processing system in response to determining that the first and second kernels have a combined cycle count that is less than or equal to a cycle budget for the first core; and assigning a buffer in a memory module for transmitting data between the first and second kernels, wherein the memory module has a direct connection to the first core.

5. The method of claim 1, wherein assigning the communication type to the plurality of communication links comprises:

selecting whether to use one of streaming and windowing to transmit data for each of the plurality of communication links based on a definition of the plurality of communication links in the graph source code.

6. The method of claim 5, wherein windowing comprises dividing received data into individual windows with a predefined or parameterized block size, and wherein each of the plurality of kernels configured to receive the individual windows waits until receiving a window on every invocation before processing the received windows.

7. The method of claim 6, wherein for at least one of the communication links that performs windowing, the individual windows have data at a beginning that overlaps with ends of previously transmitted windows so that a receiving kernel of the plurality of kernels that receives the individual windows maintains its state.

8. The method of claim 1, selecting the synchronization techniques comprises:

identifying a double buffer assigned to a first one of the plurality of communication links; and configuring a locking protocol so that a first kernel and a second kernel corresponding to the first one of the plurality of communication links can access the double buffer in parallel.

9. The method of claim 1, further comprising:

transmitting a bitstream and binary code based on compiling the graph source code that configures the heterogeneous processing system to execute the dataflow graph; and controlling execution of the dataflow graph in the heterogeneous processing system using a control program.

10. The method of claim 1, wherein the heterogeneous processing system comprises a first chip and a second chip, wherein the plurality of kernels are assigned to the first chip, wherein the graph source code defines a second plurality of kernels, and wherein compiling the graph source code comprises:

assigning the second plurality of kernels to the second chip, wherein the second plurality of kernels assigned to the second chip are configured to communicate with the plurality of kernels assigned to the first chip.

11. The method of claim 1, wherein the graph source code is independent of a hardware design of a system on a chip (SoC) forming the heterogeneous processing system and can be implemented by the compiler onto multiple different types of SoCs each having different hardware designs.

12. The method of claim 1, wherein the heterogeneous processing system comprises programmable logic and an array of data processing engines (DPEs), wherein at a least one of the plurality of kernels is assigned to the programmable logic and at least one of the plurality of kernels is assigned to one of the DPEs.

13. The method of claim 1, wherein each of the plurality of kernels includes a least one port to enable each of the plurality of kernels to communicate with another kernel in the dataflow graph, and wherein, in the dataflow graph, each one of the plurality of communication links couples a first port on a first kernel to a second port on a second kernel.

14. A host, comprising:

one or more processors;

a heterogeneous programming environment for defining a dataflow graph as object oriented source code;

graph source code generated in the heterogeneous programming environment, the graph source code defining a plurality of kernels and a plurality of communication links, wherein each of the plurality of communication links couple a respective pair of the plurality of kernels to form the dataflow graph; and a compiler configured to compile the graph source code to implement the dataflow graph in a heterogeneous processing system, wherein compiling the graph source code comprises:

assigning the plurality of kernels to the heterogeneous processing system based on constraints defined in the graph source code for the plurality of kernels, wherein the constraints are user-defined constraints that instruct the compiler to place a first kernel of the kernels in a first type of hardware element in the heterogeneous processing system and place a second kernel of the kernels in a second, different type of hardware element in the heterogeneous processing system, assigning a communication type to the plurality of communication links defined in the graph source code, and selecting synchronization techniques for transferring data between the plurality of kernels using the plurality of communication links, wherein the one or more processors are configured to configure the heterogeneous processing system to execute the dataflow graph using the compiled source code.

15. The host of claim 14, wherein assigning the plurality of kernels to the heterogeneous processing system comprises:

identifying that a first kernel and a second kernel are communicatively coupled by a first one of the plurality of communication links as defined by the graph source code;

assigning the first kernel to a first data processing engine (DPE) in the heterogeneous processing system; and assigning the second kernel to a second DPE in the heterogeneous processing system that directly neighbors the first DPE.

16. The host of claim 15, wherein the first DPE and a second DPE both have a direct connection to a shared memory module, wherein the compiler is configured to:

assign a double buffer in the shared memory module for transferring data between the first kernel and the second kernel.

17. The host of claim 14, wherein assigning the plurality of kernels to the heterogeneous processing system comprises:

identifying that a first kernel and a second kernel are communicatively coupled by a first one of the plurality of communication links as defined by the graph source code;

assigning the first kernel to a first data processing engine (DPE) in the heterogeneous processing system;

assigning the second kernel to programmable logic in the heterogeneous processing system; and configuring the second kernel to perform a direct memory access (DMA) using an interconnect to transfer data to the first kernel, wherein the interconnect interconnects an array of DPEs that includes the first DPE to each other and to programmable logic.

18. The host of claim 14, wherein the heterogeneous processing system comprises a first system on a chip (SoC) and a second SoC, wherein the plurality of kernels are assigned to the first SoC, wherein the graph source code defines a second plurality of kernels, and wherein compiling the graph source code comprises:

assigning the second plurality of kernels to the second SoC, wherein the second plurality of kernels assigned to the second SoC are configured to communicate with the plurality of kernels assigned to the first SoC.

19. A method, comprising:

providing a heterogeneous programming environment for defining a dataflow graph as object oriented source code;

receiving graph source code generated in the heterogeneous programming environment, the graph source code defining a plurality of kernels and a plurality of communication links, wherein each of the plurality of communication links couple a respective pair of the plurality of kernels to form the dataflow graph;

compiling the graph source code to implement the dataflow graph in a heterogeneous processing system using compiled source code, wherein compiling the graph source code comprises:

assigning the plurality of kernels to the heterogeneous processing system based on a definition of the plurality of kernels in the graph source code, wherein assigning the plurality of kernels to the heterogeneous processing system comprises:

identifying that a first kernel and a second kernel are communicatively coupled by a first one of the plurality of communication links as defined by the graph source code;

assigning the first kernel to a first data processing engine (DPE) in the heterogeneous processing system;

assigning the second kernel to programmable logic in the heterogeneous processing system; and configuring the second kernel to perform a direct memory access (DMA) using an interconnect to transfer data to the first kernel, wherein the interconnect interconnects an array of DPEs that includes the first DPE to each other and to programmable logic, assigning a communication type to the plurality of communication links defined in the graph source code, and selecting synchronization techniques for transferring data between the plurality of kernels using the plurality of communication links; and configuring the heterogeneous processing system to execute the dataflow graph using the compiled source code.

* * * * *